United States Patent
Natarajan et al.

(10) Patent No.: US 6,690,836 B2
(45) Date of Patent: Feb. 10, 2004

(54) CIRCUIT AND METHOD FOR DECODING AN ENCODED VERSION OF AN IMAGE HAVING A FIRST RESOLUTION DIRECTLY INTO A DECODED VERSION OF THE IMAGE HAVING A SECOND RESOLUTION

(75) Inventors: Ramachandran Natarajan, Santa Clara, CA (US); T. George Campbell, Portola Valley, CA (US)

(73) Assignee: Equator Technologies, Inc., Seattle, WA (US)

( * ) Notice: Subject to any disclaimer, the term of this patent is extended or adjusted under 35 U.S.C. 154(b) by 0 days.

(21) Appl. No.: 09/740,511

(22) Filed: Dec. 18, 2000

(65) Prior Publication Data

US 2002/0009145 A1 Jan. 24, 2002

Related U.S. Application Data

(63) Continuation-in-part of application No. PCT/US99/13952, filed on Jun. 18, 1999.

(51) Int. Cl.[7] .................................................. G06K 9/46
(52) U.S. Cl. .................... 382/250; 382/299; 375/240.21
(58) Field of Search ........................ 382/250, 232–233, 382/240, 248, 298, 299, 300, 236, 260, 264; 375/240, 240.01, 240.03, 240.16–240.17, 240.29, 240.18–240.24, 240.25; 358/432–433

(56) References Cited

U.S. PATENT DOCUMENTS

| 5,168,375 A | * | 12/1992 | Reisch et al. | 382/250 |
|---|---|---|---|---|
| 5,253,055 A | * | 10/1993 | Civanlar et al. | 375/240.24 |
| 5,579,412 A | | 11/1996 | Ando | 382/240 |
| H1684 H | * | 10/1997 | De Queiroz et al. | 382/233 |
| 5,708,732 A | | 1/1998 | Merhav et al. | 382/232 |
| 5,737,019 A | | 4/1998 | Kim | 375/240.25 |
| 5,761,343 A | | 6/1998 | Haruma et al. | 382/236 |
| 5,809,173 A | | 9/1998 | Liu et al. | 382/233 |
| 5,832,120 A | * | 11/1998 | Prabhakar et al. | 382/233 |
| 6,222,944 B1 | * | 4/2001 | Li et al. | 382/250 |
| 6,473,533 B1 | * | 10/2002 | Yokose et al. | 382/248 |

\* cited by examiner

*Primary Examiner*—Leo Boudreau
*Assistant Examiner*—Ishrat Sherali
(74) *Attorney, Agent, or Firm*—Graybeal Jackson Haley LLP

(57) ABSTRACT

An image processing circuit includes a processor that receives an encoded portion of a first version of an image. The processor decodes this encoded portion directly into a decoded portion of a second version of the image, the second version having a resolution that is different than the resolution of the first version. Therefore, such an image processing circuit can decode an encoded hi-res version of an image directly into a decoded lo-res version of the image. Alternatively, the image processing circuit includes a processor that modifies a motion vector associated with a portion of a first version of a first image. The processor then identifies a portion of a second image to which the modified motion vector points, the second image having a different resolution than the first version of the first image. Next, the processor generates a portion of a second version of the first image from the identified portion of the second image, the second version of the first image having the same resolution as the second image.

20 Claims, 15 Drawing Sheets

CIRCUIT AND METHOD FOR DECODING AN ENCODED VERSION OF AN IMAGE HAVING A FIRST RESOLUTION DIRECTLY INTO A DECODED VERSION OF THE IMAGE HAVING A SECOND RESOLUTION

This is a continuation-in-part of co-pending International Application PCT/US99/13952 filed on Jun. 18, 1999 designating the United States.

TECHNICAL FIELD

The invention relates generally to image processing circuits and techniques, and more particularly to a circuit and method for decoding an encoded version of an image having a resolution directly into a decoded version of the image having another resolution. For example, such a circuit can down-convert an encoded high-resolution (hereinafter "hi-res") version of an image directly into a decoded low-resolution (hereinafter "lo-res") version of the image without an intermediate step of generating a decoded hi-res version of the image.

BACKGROUND OF THE INVENTION

It is sometimes desirable to change the resolution of an electronic image. For example, an electronic display device such as a television set or a computer monitor has a maximum display resolution. Therefore, if an image has a higher resolution than the device's maximum display resolution, then one may wish to down-convert the image to a resolution that is lower than or equal to the maximum display resolution. For clarity, this is described hereinafter as down-converting a hi-res version of an image to a lo-res version of the same image.

FIG. 1 is a pixel diagram of a hi-res version 10 of an image and a lo-res version 12 of the same image. The hi-res version 10 is n pixels wide by t pixels high and thus has n×t pixels $P_{0,0}$-$P_{t,n}$. But if a display device (not shown) has a maximum display resolution of [n×g] pixels wide by [t×h] pixels high where g and h are less than one, then, for display purposes, one typically converts the hi-res version 10 into the lo-res version 12, which has a resolution that is less than or equal to the maximum display resolution. Therefore, to display the image on the display device with the highest possible resolution, the lo-res version 12 has (n×g)×(t×h) pixels $P_{0,0}$-$P_{(t\times h),(n\times g)}$. For example, suppose that the hi-res version 10 is n=1920 pixels wide by t=1088 pixels high. Furthermore, assume that the display device has a maximum resolution of n×g=720 pixels wide by t×h=544 pixels high. Therefore, the lo-res version 12 has a maximum horizontal resolution that is g=⅜ of the horizontal resolution of the hi-res version 10 and has a vertical resolution that is h=½ of the vertical resolution of the hi-res version 10.

Referring to FIG. 2, many versions of images such as the version 10 of FIG. 1 are encoded using a conventional block-based compression scheme before they are transmitted or stored. Therefore, for these image versions, the resolution reduction discussed above in conjunction with FIG. 1 is often carried out on a block-by-block basis. Specifically, FIG. 2 illustrates the down-converting example discussed above in conjunction with FIG. 1 on a block level for g=⅜ and h=½. An image block 14 of the hi-res version 10 (FIG. 1) is 8 pixels wide by 8 pixels high, and an image block 16 of the lo-res version 12 (FIG. 1) is 8×⅜=3 pixels wide by 8×½=4 pixels high. The pixels in the block 16 are often called sub-sampled pixels and are evenly spaced apart inside the block 16 and across the boundaries of adjacent blocks (not shown) of the lo-res version 12. For example, referring to the block 16, the sub-sampled pixel $P_{0,2}$ is the same distance from $P_{0,1}$ as it is from the pixel $P_{0,0}$ in the block (not shown) immediately to the right of the block 16. Likewise, $P_{3,0}$ is the same distance from $P_{2,0}$ as it is from the pixel $P_{0,0}$ in the block (not shown) immediately to the bottom of the block 16.

Unfortunately, because the algorithms for decoding an encoded hi-res version of an image into a decoded lo-res version of the image are inefficient, an image processing circuit that executes these algorithms often requires a relatively high-powered processor and a large memory and is thus often relatively expensive.

For example, U.S. Pat. No. 5,262,854 describes an algorithm that decodes the encoded hi-res version of the image at its full resolution and then down-converts the decoded hi-res version into the decoded lo-res version. Therefore, because only the decoded lo-res version will be displayed, generating the decoded hi-res version of the image is an unnecessary and wasteful step.

Furthermore, for encoded video images that are decoded and down converted as discussed above, the motion-compensation algorithms are often inefficient, and this inefficiency further increases the processing power and memory requirements, and thus the cost, of the image processing circuit. For example, U.S. Pat. No. 5,262,854 describes the following technique. First, a lo-res version of a reference frame is conventionally generated from a hi-res version of the reference frame and is stored in a reference-frame buffer. Next, an encoded hi-res version of a motion-compensated frame having a motion vector that points to a macro block of the reference frame is decoded at its full resolution. But the motion vector, which was generated with respect to the hi-res version of the reference frame, is incompatible with the lo-res version of the reference frame. Therefore, a processing circuit up-converts the pointed-to macro block of the lo-res version of the reference frame into a hi-res macro block that is compatible with the motion vector. The processing circuit uses interpolation to perform this up conversion. Next, the processing circuit combines the residuals and the hi-res reference macro block to generate the decoded macro block of the motion-compensated frame. Then, after the entire motion-compensated frame has been decoded into a decoded hi-res version of the motion-compensated frame, the processing circuit down-converts the decoded hi-res version into a decoded lo-res version. Therefore, because reference macro blocks are down-converted for storage and display and then up-converted for motion compensation, this technique is very inefficient.

Unfortunately, the image processing circuits that execute the above-described down-conversion and motion-compensation techniques may be too expensive for many consumer applications. For example, with the advent of high-definition television (HDTV), it is estimated that many consumers cannot afford to replace their standard television sets with HDTV receiver/displays. Therefore, a large consumer market is anticipated for HDTV decoders that down-convert HDTV video frames to standard-resolution video frames for display on standard television sets. But if these decoders incorporate the relatively expensive image processing circuits described above, then many consumers that cannot afford a HDTV receiver may also be unable to afford a HDTV decoder.

Overview of Conventional Image-Compression Techniques

To help the reader more easily understand the concepts discussed above and discussed below in the description of the invention, following is a basic overview of conventional image-compression techniques.

To electronically transmit a relatively high-resolution image over a relatively low-band-width channel, or to electronically store such an image in a relatively small memory space, it is often necessary to compress the digital data that represents the image. Such image compression typically involves reducing the number of data bits necessary to represent an image. For example, High-Definition-Television (HDTV) video images are compressed to allow their transmission over existing television channels. Without compression, HDTV video images would require transmission channels having bandwidths much greater than the bandwidths of existing television channels. Furthermore, to reduce data traffic and transmission time to acceptable levels, an image may be compressed before being sent over the internet. Or, to increase the image-storage capacity of a CD-ROM or server, an image may be compressed before being stored thereon.

Referring to FIGS. 3A–9, the basics of the popular block-based Moving Pictures Experts Group (MPEG) compression standards, which include MPEG-1 and MPEG-2, are discussed. For purposes of illustration, the discussion is based on using an MPEG 4:2:0 format to compress video images represented in a Y, $C_B$, $C_R$ color space. However, the discussed concepts also apply to other MPEG formats, to images that are represented in other color spaces, and to other block-based compression standards such as the Joint Photographic Experts Group (JPEG) standard, which is often used to compress still images. Furthermore, although many details of the MPEG standards and the Y, $C_B$, $C_R$ color space are omitted for brevity, these details are well-known and are disclosed in a large number of available references.

Still referring to FIGS. 3A–9, the MPEG standards are often used to compress temporal sequences of images— video frames for purposes of this discussion—such as found in a television broadcast. Each video frame is divided into subregions called macro blocks, which each include one or more pixels. FIG. 3A is a 16-pixel-by-16-pixel macro block 30 having 256 pixels 32 (not drawn to scale). In the MPEG standards, a macro block is always 16×16 pixels, although other compression standards may use macro blocks having other dimensions. In the original video frame, i.e., the frame before compression, each pixel 32 has a respective luminance value Y and a respective pair of color-, i.e., chroma-, difference values $C_B$ and $C_R$.

Referring to FIGS. 3A–3D, before compression of the frame, the digital luminance (Y) and chroma-difference ($C_B$ and $C_R$) values that will be used for compression, i.e., the pre-compression values, are generated from the original Y, $C_B$, and $C_R$ values of the original frame. In the MPEG 4:2:0 format, the pre-compression Y values are the same as the original Y values. Thus, each pixel 32 merely retains its original luminance value Y. But to reduce the amount of data to be compressed, the MPEG 4:2:0 format allows only one pre-compression CB value and one pre-compression $C_R$ value for each group 34 of four pixels 32. Each of these pre-compression $C_B$ and $C_R$ values are respectively derived from the original $C_B$ and $C_R$ values of the four pixels 32 in the respective group 34. For example, a pre-compression $C_B$ value may equal the average of the original $C_B$ values of the four pixels 32 in the respective group 34. Thus, referring to FIGS. 3B–3D, the pre-compression Y, $C_B$, and $C_R$ values generated for the macro block 10 are arranged as one 16×16 matrix 36 of pre-compression Y values (equal to the original Y values for each respective pixel 32), one 8×8 matrix 38 of pre-compression $C_B$ values (equal to one derived $C_B$ value for each group 34 of four pixels 32), and one 8×8 matrix 40 of pre-compression $C_R$ values (equal to one derived $C_R$ value for each group 34 of four pixels 32). The matrices 36, 38, and 40 are often called "blocks" of values. Furthermore, because it is convenient to perform the compression transforms on 8×8 blocks of pixel values instead of on 16×16 blocks, the block 36 of pre-compression Y values is subdivided into four 8×8 blocks 42a–42d, which respectively correspond to the 8×8 blocks A–D of pixels in the macro block 30. Thus, referring to FIGS. 3A–3D, six 8×8 blocks of pre-compression pixel data are generated for each macro block 30: four 8×8 blocks 42a–42d of pre-compression Y values, one 8×8 block 38 of pre-compression $C_B$ values, and one 8×8 block 40 of pre-compression $C_R$ values.

FIG. 4 is a block diagram of an MPEG compressor 50, which is more commonly called an encoder. Generally, the encoder 50 converts the pre-compression data for a frame or sequence of frames into encoded data that represent the same frame or frames with significantly fewer data bits than the pre-compression data. To perform this conversion, the encoder 50 reduces or eliminates redundancies in the pre-compression data and reformats the remaining data using efficient transform and coding techniques.

More specifically, the encoder 50 includes a frame-reorder buffer 52, which receives the pre-compression data for a sequence of one or more frames and reorders the frames in an appropriate sequence for encoding. Thus, the reordered sequence is often different than the sequence in which the frames are generated and will be displayed. The encoder 50 assigns each of the stored frames to a respective group, called a Group Of Pictures (GOP), and labels each frame as either an intra (I) frame or a non-intra (non-I) frame. For example, each GOP may include three I frames and twelve non-I frames for a total of fifteen frames. The encoder 50 always encodes an I frame without reference to another frame, but can and often does encode a non-I frame with reference to one or more of the other frames in the GOP. The encoder 50 does not, however, encode a non-I frame with reference to a frame in a different GOP.

Referring to FIGS. 4 and 5, during the encoding of an I frame, the 8×8 blocks (FIGS. 3B–3D) of the pre-compression Y, $C_B$, and $C_R$ values that represent the I frame pass through a summer 54 to a Discrete Cosine Transformer (DCT) 56, which transforms these blocks of values into respective 8×8 blocks of one DC (zero frequency) transform value and sixty-three AC (non-zero frequency) transform values. FIG. 5 is a block 57 of luminance transform values Y-DCT$_{(0,0)a}$–Y-DCT$_{(7,7)a}$, which correspond to the pre-compression luminance pixel values $Y_{(0,0)a}$–$Y_{(7,7)a}$ in the block 36 of FIG. 3B. Thus, the block 57 has the same number of luminance transform values Y-DCT as the block 36 has of luminance pixel values Y. Likewise, blocks of chroma transform values $C_B$-DCT and $C_R$-DCT (not shown) correspond to the chroma pixel values in the blocks 38 and 40. Furthermore, the pre-compression Y, $C_B$, and $C_R$ values pass through the summer 54 without being summed with any other values because the summer 54 is not needed when the encoder 50 encodes an I frame. As discussed below, however, the summer 54 is often needed when the encoder 50 encodes a non-I frame.

Referring to FIGS. 4 and 6, a quantizer and zigzag scanner 58 limits each of the transform values from the DCT 56 to a respective maximum value, and provides the quantized AC and DC transform values on respective paths 60 and 62. FIG. 6 is an example of a zigzag scan pattern 63, which the quantizer and zigzag scanner 58 may implement. Specifically, the quantizer and scanner 58 reads the transform values in the transform block (such as the transform block 57 of FIG. 5) in the order indicated. Thus, the quantizer and scanner 58 reads the transform value in the "0" position first, the transform value in the "1" position second, the transform value in the "2" position third, and so on until it reads the transform value in the "63" position last. The quantizer and zigzag scanner 58 reads the transform values in this zigzag pattern to increase the coding efficiency as is known. Of course, depending upon the coding technique and the type of images being encoded, the quantizer and zigzag scanner 58 may implement other scan patterns too.

Referring again to FIG. 4, a prediction encoder 64 predictively encodes the DC transform values, and a variable-length coder 66 converts the quantized AC transform values and the quantized and predictively encoded DC transform values into variable-length codes such as Huffman codes. These codes form the encoded data that represent the pixel values of the encoded I frame. A transmit buffer 68 then temporarily stores these codes to allow synchronized transmission of the encoded data to a decoder (discussed below in conjunction with FIG. 8). Alternatively, if the encoded data is to be stored instead of transmitted, the coder 66 may provide the variable-length codes directly to a storage medium such as a CD-ROM.

If the I frame will be used as a reference (as it often will be) for one or more non-I frames in the GOP, then, for the following reasons, the encoder 50 generates a corresponding reference frame by decoding the encoded I frame with a decoding technique that is similar or identical to the decoding technique used by the decoder (FIG. 8). When decoding non-I frames that are referenced to the I frame, the decoder has no option but to use the decoded I frame as a reference frame. Because MPEG encoding and decoding are lossy—some information is lost due to quantization of the AC and DC transform values—the pixel values of the decoded I frame will often be different than the pre-compression pixel values of the original I frame. Therefore, using the pre-compression I frame as a reference frame during encoding may cause additional artifacts in the decoded non-I frame because the reference frame used for decoding (decoded I frame) would be different than the reference frame used for encoding (pre-compression I frame).

Therefore, to generate a reference frame for the encoder that will be similar to or the same as the reference frame for the decoder, the encoder 50 includes a dequantizer and inverse zigzag scanner 70, and an inverse DCT 72, which are designed to mimic the dequantizer and scanner and the inverse DCT of the decoder (FIG. 8). The dequantizer and inverse scanner 70 first implements an inverse of the zigzag scan path implemented by the quantizer 58 such that the DCT values are properly located within respective decoded transform blocks. Next, the dequantizer and inverse scanner 70 dequantizes the quantized DCT values, and the inverse DCT 72 transforms these dequantized DCT values into corresponding 8×8 blocks of decoded Y, $C_B$, and $C_R$ pixel values, which together compose the reference frame. Because of the losses incurred during quantization, however, some or all of these decoded pixel values may be different than their corresponding pre-compression pixel values, and thus the reference frame may be different than its corresponding pre-compression frame as discussed above. The decoded pixel values then pass through a summer 74 (used when generating a reference frame from a non-I frame as discussed below) to a reference-frame buffer 76, which stores the reference frame.

During the encoding of a non-I frame, the encoder 50 initially encodes each macro-block of the non-I frame in at least two ways: in the manner discussed above for I frames, and using motion prediction, which is discussed below. The encoder 50 then saves and transmits the resulting code having the fewest bits. This technique insures that the macro blocks of the non-I frames are encoded using the fewest bits.

With respect to motion prediction, an object in a frame exhibits motion if its relative position changes in the preceding or succeeding frames. For example, a horse exhibits relative motion if it gallops across the screen. Or, if the camera follows the horse, then the background exhibits relative motion with respect to the horse. Generally, each of the succeeding frames in which the object appears contains at least some of the same macro blocks of pixels as the preceding frames. But such matching macro blocks in a succeeding frame often occupy respective frame locations that are different than the respective frame locations they occupy in the preceding frames. Alternatively, a macro block that includes a portion of a stationary object (e.g., tree) or background scene (e.g., sky) may occupy the same frame location in each of a succession of frames, and thus exhibit "zero motion". In either case, instead of encoding each frame independently, it often takes fewer data bits to tell the decoder "the macro blocks R and Z of frame 1 (non-I frame) are the same as the macro blocks that are in the locations S and T, respectively, of frame 0 (reference frame)." This "statement" is encoded as a motion vector. For a relatively fast moving object, the location values of the motion vectors are relatively large. Conversely, for a stationary or relatively slow-moving object or background scene, the location values of the motion vectors are relatively small or equal to zero.

FIG. 7 illustrates the concept of motion vectors with reference to the non-I frame 1 and the reference frame 0 discussed above. A motion vector $MV_R$ indicates that a match for the macro block in the location R of frame 1 can be found in the location S of a reference frame 0. $MV_R$ has three components. The first component, here 0, indicates the frame (here frame 0) in which the matching macro block can be found. The next two components, $X_R$ and $Y_R$, together comprise the two-dimensional location value that indicates where in the frame 0 the matching macro block is located. Thus, in this example, because the location S of the frame 0 has the same X-Y coordinates as the location R in the frame 1, $X_R=Y_R=0$. Conversely, the macro block in the location T matches the macro block in the location Z, which has different X-Y coordinates than the location T. Therefore, $X_z$ and $Y_z$ represent the location T with respect to the location Z. For example, suppose that the location T is ten pixels to the left of (negative X direction) and seven pixels down from (negative Y direction) the location Z. Therefore, $MV_z=(0,-10,-7)$. Although there are many other motion-vector schemes available, they are all based on the same general concept. For example, the locations R may be bidirectionally encoded. That is, the location R may have two motion vectors that point to respective matching locations in different frames, one preceding and the other succeeding the frame 1. During decoding, the pixel values of these matching locations are averaged or otherwise combined to calculate the pixel values of the location.

Referring again to FIG. 4, motion prediction is now discussed in detail. During the encoding of a non-I frame, a motion predictor 78 compares the pre-compression Y values—the $C_B$ and $C_R$ values are not used during motion prediction—of the macro blocks in the non-I frame to the decoded Y values of the respective macro blocks in the reference I frame and identifies matching macro blocks. For each macro block in the non-I frame for which a match is found in the I reference frame, the motion predictor 78 generates a motion vector that identifies the reference frame and the location of the matching macro block within the reference frame. Thus, as discussed below in conjunction with FIG. 8, during decoding of these motion-encoded macro blocks of the non-I frame, the decoder uses the motion vectors to obtain the pixel values of the motion-encoded macro blocks from the matching macro blocks in the reference frame. The prediction encoder 64 predictively encodes the motion vectors, and the coder 66 generates respective codes for the encoded motion vectors and provides these codes to the transmit buffer 48.

Furthermore, because a macro block in the non-I frame and a matching macro block in the reference I frame are often similar but not identical, the encoder 50 encodes these differences along with the motion vector so that the decoder can account for them. More specifically, the motion predictor 78 provides the decoded Y values of the matching macro block of the reference frame to the summer 54, which effectively subtracts, on a pixel-by-pixel basis, these Y values from the pre-compression Y values of the matching macro block of the non-I frame. These differences, which are called residuals, are arranged in 8×8 blocks and are processed by the DCT 56, the quantizer and scanner 58, the coder 66, and the buffer 68 in a manner similar to that discussed above, except that the quantized DC transform values of the residual blocks are coupled directly to the coder 66 via the line 60, and thus are not predictively encoded by the prediction encoder 44.

In addition, it is possible to use a non-I frame as a reference frame. When a non-I frame will be used as a reference frame, the quantized residuals from the quantizer and zigzag scanner 58 are respectively dequantized, reordered, and inverse transformed by the dequantizer and inverse scanner 70 and the inverse DCT 72, respectively, so that this non-I reference frame will be the same as the one used by the decoder for the reasons discussed above. The motion predictor 78 provides to the summer 74 the decoded Y values of the reference frame from which the residuals were generated. The summer 74 adds the respective residuals from the inverse DCT 72 to these decoded Y values of the reference frame to generate the respective Y values of the non-I reference frame. The reference-frame buffer 76 then stores the reference non-I frame along with the reference I frame for use in motion encoding subsequent non-I frames.

Although the circuits 58 and 70 are described as performing the zigzag and inverse zigzag scans, respectively, in other embodiments, another circuit may perform the zigzag scan and the inverse zigzag scan may be omitted. For example, the coder 66 can perform the zigzag scan and the circuit 58 can perform the quantization only. Because the zigzag scan is outside of the reference-frame loop, the dequantizer 70 can omit the inverse zigzag scan. This saves processing power and processing time.

Still referring to FIG. 4, the encoder 50 also includes a rate controller 80 to insure that the transmit buffer 68, which typically transmits the encoded frame data at a fixed rate, never overflows or empties, i.e., underflows. If either of these conditions occurs, errors may be introduced into the encoded data stream. For example, if the buffer 68 overflows, data from the coder 66 is lost. Thus, the rate controller 80 uses feed back to adjust the quantization scaling factors used by the quantizer/scanner 58 based on the degree of fullness of the transmit buffer 68. Specifically, the fuller the buffer 68, the larger the controller 80 makes the scale factors, and the fewer data bits the coder 66 generates. Conversely, the more empty the buffer 68, the smaller the controller 80 makes the scale factors, and the more data bits the coder 66 generates. This continuous adjustment insures that the buffer 68 neither overflows or underflows.

FIG. 8 is a block diagram of a conventional MPEG decompresser 82, which is commonly called a decoder and which can decode frames that are encoded by the encoder 60 of FIG. 4.

Referring to FIGS. 8 and 9, for I frames and macro blocks of non-I frames that are not motion predicted, a variable-length decoder 84 decodes the variable-length codes received from the encoder 50. A prediction decoder 86 decodes the predictively decoded DC transform values, and a dequantizer and inverse zigzag scanner 87, which is similar or identical to the dequantizer and inverse zigzag scanner 70 of FIG. 4, dequantizes and rearranges the decoded AC and DC transform values. Alternatively, another circuit such as the decoder 84 can perform the inverse zigzag scan. An inverse DCT 88, which is similar or identical to the inverse DCT 72 of FIG. 4, transforms the dequantized transform values into pixel values. For example, FIG. 9 is a block 89 of luminance inverse-transform values Y-IDCT, i.e., decoded luminance pixel values, which respectively correspond to the luminance transform values Y-DCT in the block 57 of FIG. 5 and to the pre-compression luminance pixel values $Y_a$ of the block 42*a* of FIG. 3B. But because of losses due to the quantization and dequantization respectively implemented by the encoder 50 (FIG. 4) and the decoder 82, the decoded pixel values in the block 89 are often different than the respective pixel values in the block 42*a*.

Still referring to FIG. 8, the decoded pixel values from the inverse DCT 88 pass through a summer 90—which is used during the decoding of motion-predicted macro blocks of non-I frames as discussed below—into a frame-reorder buffer 92, which stores the decoded frames and arranges them in a proper order for display on a video display unit 94. If a decoded frame is used as a reference frame, it is also stored in the reference-frame buffer 96.

For motion-predicted macro blocks of non-I frames, the decoder 84, dequantizer and inverse scanner 87, and inverse DCT 88 process the residual transform values as discussed above for the transform values of the I frames. The prediction decoder 86 decodes the motion vectors, and a motion interpolator 98 provides to the summer 90 the pixel values from the reference-frame macro blocks to which the motion vectors point. The summer 90 adds these reference pixel values to the residual pixel values to generate the pixel values of the decoded macro blocks, and provides these decoded pixel values to the frame-reorder buffer 92. If the encoder 50 (FIG. 4) uses a decoded non-I frame as a reference frame, then this decoded non-I frame is stored in the reference-frame buffer 96.

Referring to FIGS. 4 and 8, although described as including multiple functional circuit blocks, the encoder 50 and the decoder 82 may be implemented in hardware, software, or a combination of both. For example, the encoder 50 and the decoder 82 are often implemented by a respective one or more processors that perform the respective functions of the circuit blocks.

More detailed discussions of the MPEG encoder 50 and the MPEG decoder 82 of FIGS. 4 and 8, respectively, and of the MPEG standard in general are available in many publications including "Video Compression" by Peter D. Symes, McGraw-Hill, 1998, which is incorporated by reference. Furthermore, there are other well-known block-based compression techniques for encoding and decoding both video and still images.

SUMMARY OF THE INVENTION

In one aspect of the invention, an image processing circuit includes a processor that receives an encoded portion of a first version of an image. The processor decodes this encoded portion directly into a decoded portion of a second version of the image, the second version having a resolution that is different than the resolution of the first version.

Therefore, such an image processing circuit can decode an encoded hi-res version of an image directly into a decoded lo-res version of the image. That is, such a circuit eliminates the inefficient step of decoding the encoded hi-res version at full resolution before down converting to the lo-res version. Thus, such an image processing circuit is often faster, less complex, and less expensive than prior-art circuits that decode and down-convert images.

In another aspect of the invention, an image processing circuit includes a processor that modifies a motion vector associated with a portion of a first version of a first image. The processor then identifies a portion of a second image to which the modified motion vector points, the second image having a different resolution than the first version of the first image. Next, the processor generates a portion of a second version of the first image from the identified portion of the second image, the second version of the first image having the same resolution as the second image.

Thus, such an image processing circuit can decode a motion-predicted macro block using a version of a reference frame that has a different resolution than the version of the reference frame used to encode the macro block. Thus, such an image processing circuit is often faster, less complex, and less expensive than prior-art circuits that down-convert motion-predicted images.

DETAILED DESCRIPTION OF THE INVENTION

Figure 10:
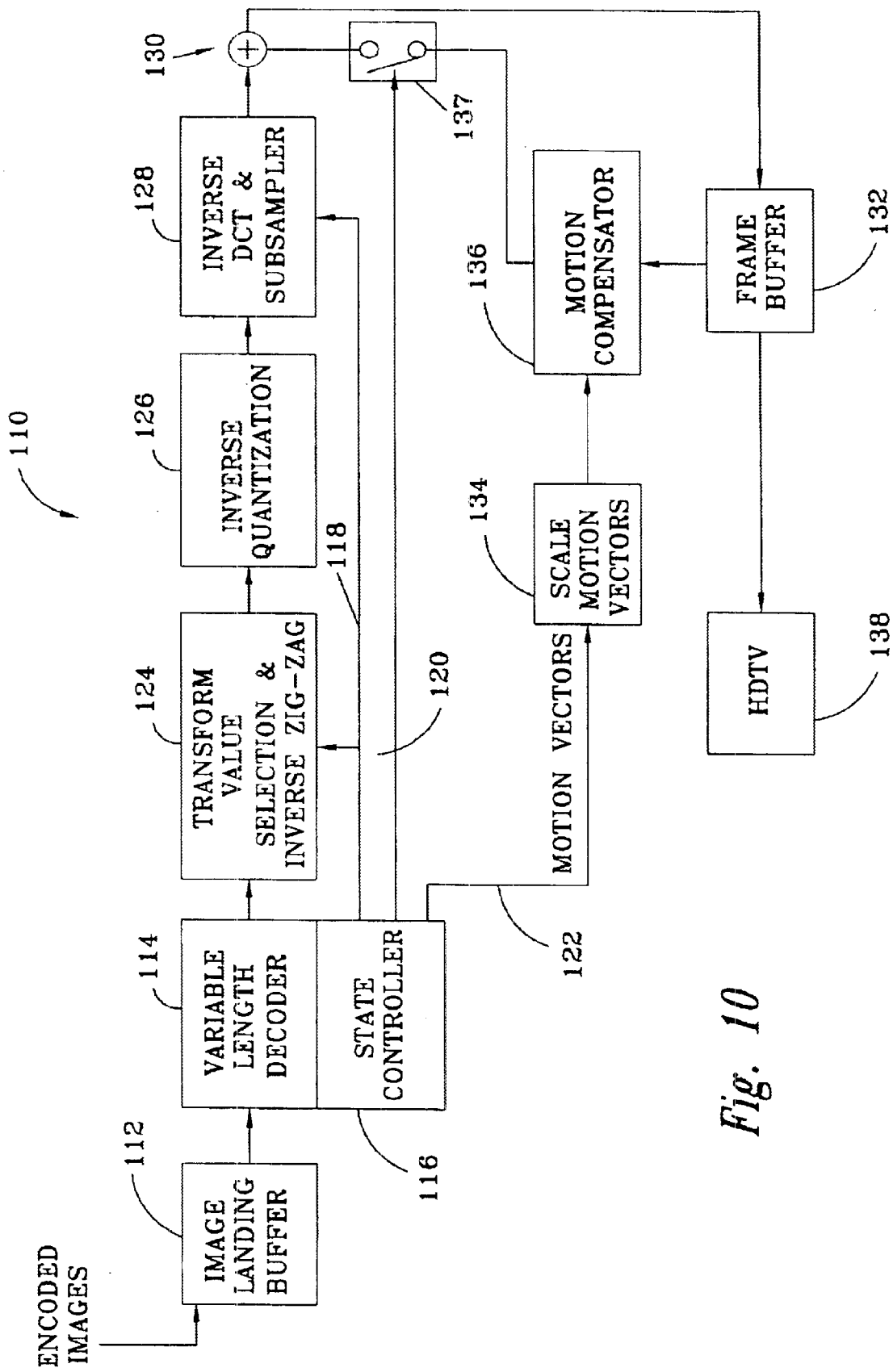
FIG. 10 is a block diagram of an MPEG decoder according to an embodiment of the invention.

FIG. 10 is a block diagram of an image decoder and processing circuit 110 according to an embodiment of the invention. The circuit 110 includes a landing buffer 112, which receives and stores respective hi-res versions of encoded images. A variable-length decoder 114 receives the encoded image data from the landing buffer 112 and separates the data blocks that represent the image from the control data that accompanies the image data. A state controller 116 receives the control data and respectively provides on lines 118, 120, and 122 a signal that indicates whether the encoded images are interlaced or non-interlaced, a signal that indicates whether the block currently being decoded is motion predicted, and the decoded motion vectors. A transform-value select and inverse zigzag circuit 124 selects the desired transform values from each of the image blocks and scans them according to a desired inverse zigzag pattern. Alternatively, another circuit such as the decoder 114 can perform the inverse zigzag scan. An inverse quantizer 126 dequantizes the selected transform values, and an inverse DCT and subsampler circuit 128 directly converts the dequantized transform values of the hi-res version of an image into pixel values of a lo-res version of the same image.

For I-encoded blocks, the sub-sampled pixel values from the circuit 128 pass through a summer 130 to an image buffer 132, which that stores the decoded lo-res versions of the images.

For motion-predicted blocks, a motion-vector scaling circuit 134 scales the motion vectors from the state controller 116 to the same resolution as the lo-res versions of the images stored in the buffer 132. A motion compensation circuit 136 determines the values of the pixels in the matching macro block that is stored in the buffer 136 and that is pointed to by the scaled motion vector. In response to the signal on the line 120, a switch 137 couples these pixel values from the circuit 136 to the summer 130, which respectively adds them to the decoded and sub-sampled residuals from the circuit 128. The resultant sums are the pixel values of the decoded macro block, which is stored in the frame buffer 132. The frame buffer 132 stores the decoded lo-res versions of the images in display order and provides the lo-res versions to an HDTV receive/display 138.

Figure 11:
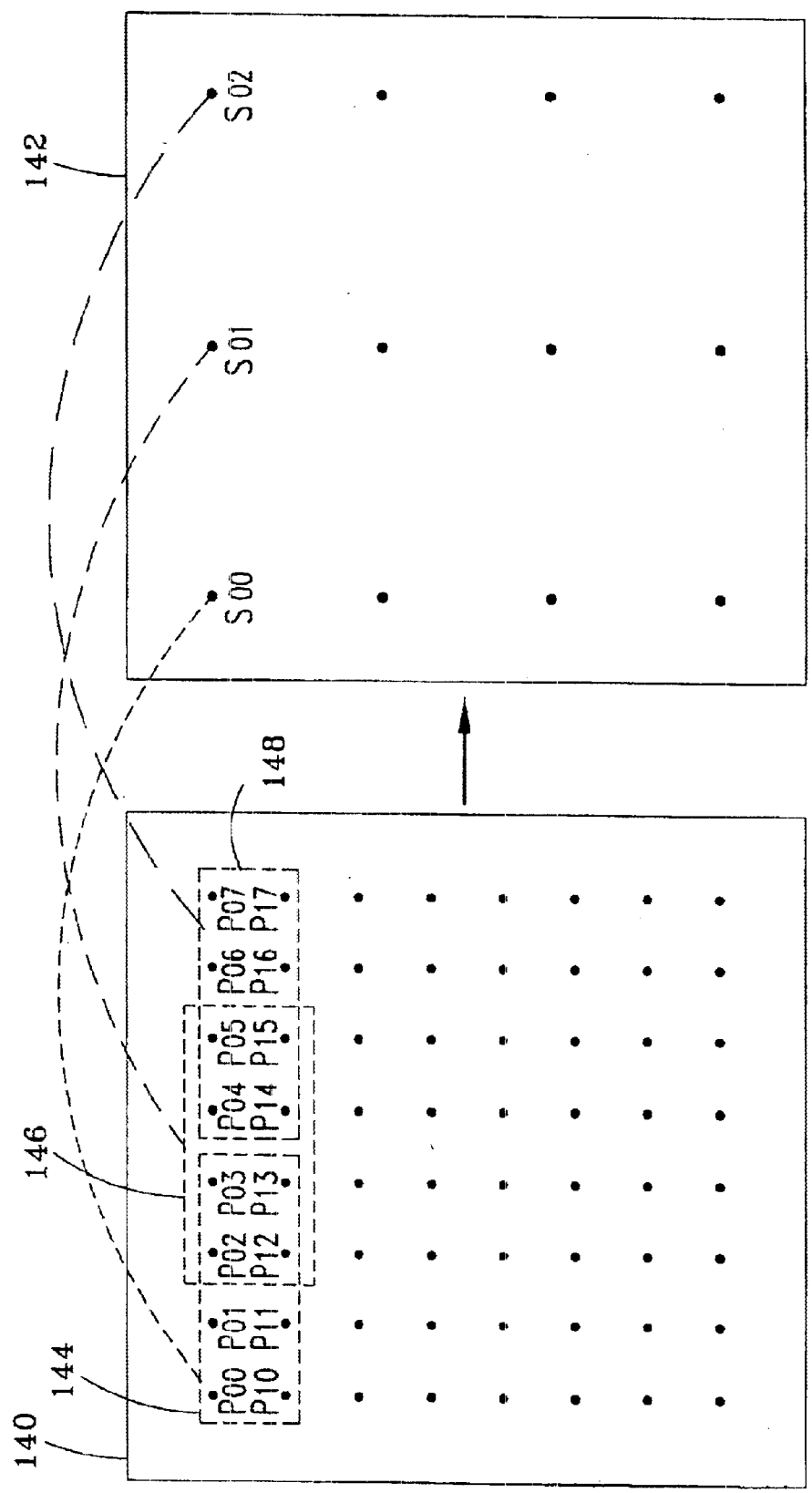
FIG. 11 shows a technique for converting a hi-res, non-interlaced block of pixel values into a lo-res, non-interlaced block of pixel values according to an embodiment of the invention.

FIG. 11 illustrates the resolution reduction performed by the IDCT and sub-sampler circuit 128 of FIG. 10 on non-interlaced images according to an embodiment of the invention. Although the circuit 128 converts an encoded hi-res version of a non-interlaced image directly into a decoded lo-res version of the image, for clarity, FIG. 11 illustrates this resolution reduction in the pixel domain. Specifically, an 8×8 block 140 of pixels P from the hi-res version of the image is down converted to a 4×3 block 142 of sub-sampled pixels S. Therefore, in this example, the horizontal resolution of the block 142 is ⅜ the horizontal resolution of the block 140 and the vertical resolution of the block 142 is ½ the vertical resolution of the block 140. The value of the sub-sampled pixel $S_{00}$ in the block 142 is determined from a weighted combination of the values of the pixels P in the sub-block 144 of the block 140. That is, $S_{00}$ is a combination of $w_{00}P_{00}$, $w_{01}P_{01}$, $w_{02}P_{02}$, $w_{03}P_{03}$, $W_{10}P_{10}$, $w_{11}P_{11}$, $w_{12}P_{12}$, and $w_{13}P_{13}$, where $w_{00}$–$W_{13}$ are the respective weightings of the values for $P_{00}$–$P_{13}$. The calculation of the weightings w are discussed below in conjunction with FIGS. 13a and 13b. Likewise, the value of the sub-sampled pixel $S_{01}$ is determined from a weighted combination of the values of the pixels P in the sub-block 146, the value of the sub-sampled pixel $S_{02}$ is determined from a weighted combination of the values of the pixels P in the sub-block 148, and so on. Furthermore, although the blocks 140 and 142 and the sub-blocks 144, 146, and 148 are shown having specific dimensions, they may have other dimensions in other embodiments of the invention.

Figure 12:
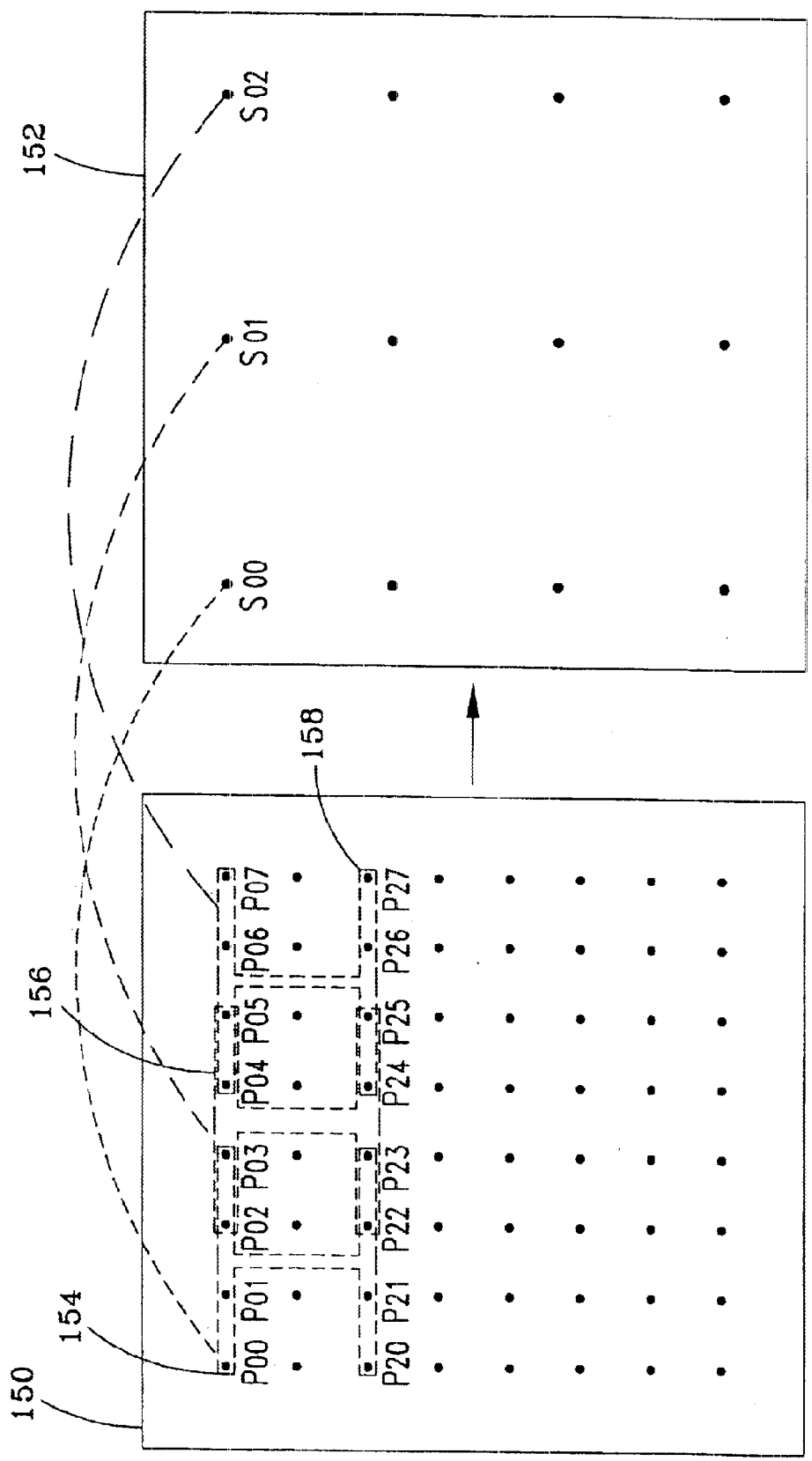
FIG. 12 shows a technique for converting a hi-res, interlaced block of pixel values into a lo-res, interlaced block of pixel values according to an embodiment of the invention.

FIG. 12 illustrates the resolution reduction performed by the IDCT and sub-sampler circuit 128 of FIG. 10 on interlaced images according to an embodiment of the invention. Although the circuit 128 converts an encoded hi-res version of an interlaced image directly into a decoded lo-res version of the image, for clarity, FIG. 12 illustrates this resolution reduction in the pixel domain. Specifically, an 8×8 block 150 of pixels P from the hi-res version of the image is down converted to a 4×3 block 152 of sub-sampled pixels S. Therefore, in this example, the horizontal resolution of the block 152 is ⅜ the horizontal resolution of the block 150 and the vertical resolution of the block 152 is ½ the vertical resolution of the block 150. The value of the sub-sampled pixel $S_{00}$ in the block 152 is determined from a weighted combination of the values of the pixels P in the sub-block 154 of the block 150. That is, $S_{00}$ is a combination of $w_{00}P_{00}$, $w_{01}P_{01}$, $w_{02}P_{02}$, $w_{03}P_{03}$, $w_{20}P_{20}$, $w_{21}P_{21}$, $w_{22}P_{22}$, and $w_{23}P_{23}$, where $w_{00}$ $w_{23}$ are the respective weightings of the values for $P_{00}$–$P_{23}$. Likewise, the value of the sub-sampled pixel $S_{01}$ is determined from a weighted combination of the values of the pixels P in the sub-block 156, the value of the sub-sampled pixel $S_{02}$ is determined from a weighted combination of the values of the pixels P in the sub-block 158, and so on. Furthermore, although the blocks 150 and 152 and the sub-blocks 154, 156, and 158 are shown having specific dimensions, they may have other dimensions in other embodiments of the invention.

Figures 13A, 13B:
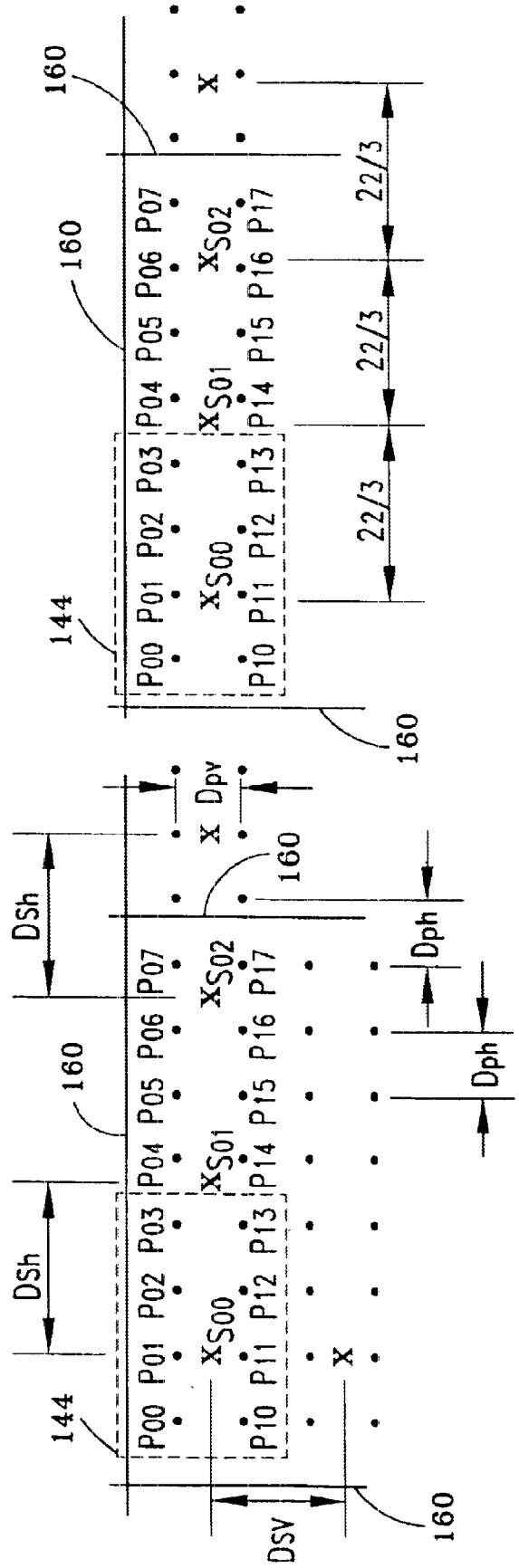
FIG. 13A shows the lo-res block of FIG. 11 overlaying the hi-res block of FIG. 11 according to an embodiment of the invention.
FIG. 13B shows the lo-res block of FIG. 11 overlaying the hi-res block of FIG. 11 according to another embodiment of the invention.

FIG. 13A shows the lo-res block 142 of FIG. 11 overlaying the hi-res block 140 of FIG. 11 according to an embodiment of the invention. Block boundaries 160 are the boundaries for both of the overlaid blocks 140 and 142, the sub-sampled pixels S are marked as X's, and the pixels P are marked as dots. The sub-sampled pixels S are spaced apart by a horizontal distance Dsh and a vertical distance Dsv both within and across the block boundaries 160. Similarly, the pixels P are spaced apart by a horizontal distance Dph and a vertical distance Dpv. In the illustrated example, Dsh= ⅜(Dph) and Dsv=2(Dpv). Because $S_{00}$ is horizontally aligned with and thus horizontally closest to the pixels $P_{01}$ and $P_{11}$, the values of these pixels are weighted more heavily in determining the value of $S_{00}$ than are the values of the more horizontally distant pixels $P_{00}$, $P_{10}$, $P_{02}$, $P_{12}$, $P_{03}$, and $P_{13}$. Furthermore, because $S_{00}$ is halfway between row 0 (i.e., $P_{00}$, $P_{01}$, $P_{02}$, and $P_{03}$) and row 1 (i.e., $P_{10}$, $P_{11}$, $P_{12}$, and $P_{13}$) of the pixels P, all the pixels P in rows 0 and 1 are weighted equally in the vertical direction. For example, in one embodiment, the values of the pixels $P_{00}$, $P_{02}$, $P_{03}$, $P_{10}$, $P_{12}$, and $P_{13}$ are weighted with w=0 such that they contribute nothing to the value of $S_{00}$, and the values $P_{01}$ and $P_{11}$ are averaged together to obtain the value of $S_{00}$. The values of $S_{01}$ and $S_{02}$ are calculated in a similar manner using the weighted values of the pixels P in the sub-blocks 146 and 148 (FIG. 11), respectively. But because the sub-sampled pixels $S_{00}$, $S_{01}$, and $S_{02}$ are located at different horizontal positions within their respective sub-blocks 144, 146, and 148, the sets of weightings w used to calculate the values of $S_{00}$, $S_{01}$, and $S_{02}$ are different from one another. The values of the remaining sub-sampled pixels S are calculated in a similar manner.

FIG. 13B shows the lo-res block 142 of FIG. 11 overlaying the hi-res block 140 of FIG. 11 according to another embodiment of the invention. A major difference between the overlays of FIGS. 13A and 13B is that in the overlay of FIG. 13B, the sub-sampled pixels S are horizontally shifted to the left with respect to their positions in FIG. 13A. Because of this shift, the pixel weightings w are different than those used in FIG. 13A. But other than the different weightings, the values of the sub-sampled pixels S are calculated in a manner similar to that described above in conjunction with FIG. 13A.

Figure 14:
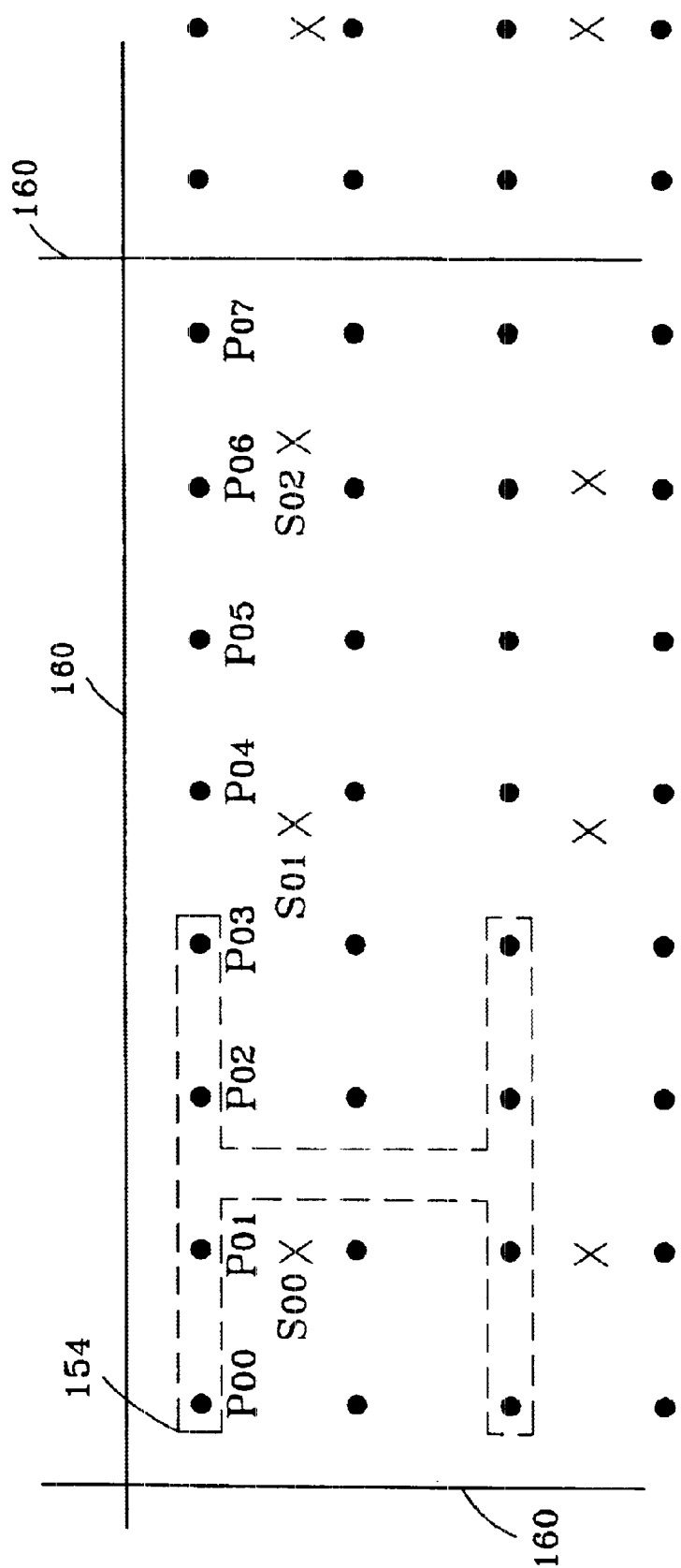
FIG. 14 shows the lo-res block of FIG. 12 overlaying the hi-res block of FIG. 12 according to an embodiment of the invention.

FIG. 14 shows the lo-res block 152 of FIG. 12 overlaying the hi-res block 150 of FIG. 12 according to an embodiment of the invention. The sub-sampled pixels S have the same positions as in FIG. 13a, so the horizontal weightings are the same as those for FIG. 13a. But because the pixels P and sub-sampled pixels S are interlaced, the pixels S are not halfway between row 0 (i.e., $P_{00}$, $P_{01}$, $P_{02}$, and $P_{03}$) and row 1 (i.e., $P_{20}$, $P_{21}$, $P_{22}$, and $P_{23}$) of the sub-block 154. Therefore, the pixels P in row 0 are weighted more heavily than the respective pixels P in row 1. For example, in one embodiment, the values of the pixels $P_{00}$, $P_{02}$, $P_{03}$, $P_{20}$, $P_{22}$, and $P_{23}$ are weighted with w=0 such that they contribute nothing to the value of $S_{00}$, and the value of $P_{01}$ is weighted more heavily that the value of $P_{21}$. For example, the value of $S_{00}$ can be calculated by straight-line interpolation, i.e., bilinear filtering, between the values of $P_{01}$ and $P_{21}$.

The techniques described above in conjunction with FIGS. 13A, 13B, and 14 can be used to calculate the luminance or chroma values of the sub-sampled pixels S.

Figure 15A:
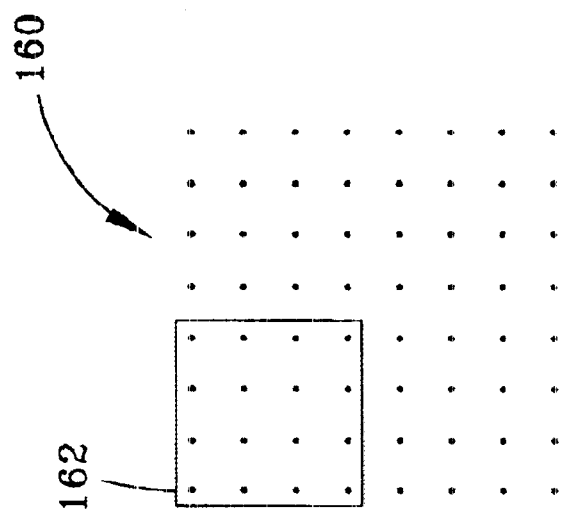
FIG. 15A shows a subgroup of transform values used to directly down-convert the hi-res block of FIG. 11 to the lo-res block of FIG. 11 according to an embodiment of the invention.
Figure 15B:
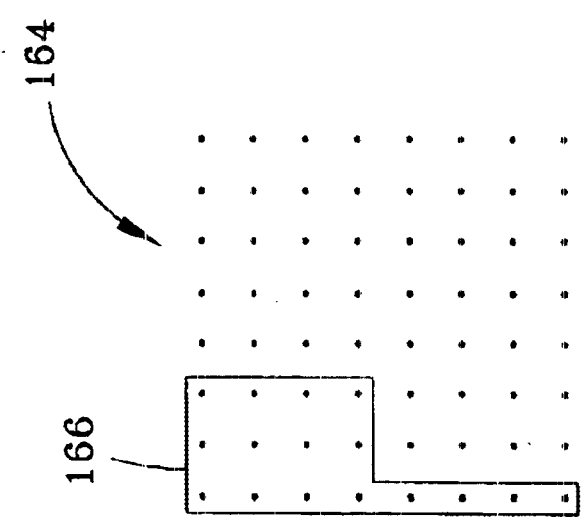
FIG. 15B shows a subgroup of transform values used to directly down-convert the hi-res block of FIG. 12 to the lo-res block of FIG. 12 according to an embodiment of the invention.

Referring to FIGS. 10 and 15A, the variable length decoder 114 provides a block 160 of transform values (shown as dots), which represent a block of an encoded, non-interlaced image, to the selection and inverse zigzag circuit 124. The circuit 124 selects and uses only a sub-block 162 of the transform values to generate the values of the non-interlaced sub-sampled pixels S of FIGS. 11, 13A, and 13B. Because the circuit 110 decodes and down-converts the received images to a lower resolution, the inventors have found that much of the encoded information, i.e., many of the transform values, can be eliminated before the inverse DCT and sub-sampler circuit 128 decodes and down-converts the encoded macro blocks. Eliminating this information significantly reduces the processing power and time that the decoder 110 requires to decode and down-convert encoded images. Specifically, the lo-res version of the image lacks the fine detail of the hi-res version, and the fine detail of an image block is represented by the higher-frequency transform values in the corresponding transform block. These higher-frequency transform values are located toward and in the lower right-hand quadrant of the transform block. Conversely, the lower-frequency transform values are located toward and in the upper left-hand quadrant, which is equivalent to the sub-block 162. Therefore, by using the sixteen lower-frequency transform values in the sub-block 162 and discarding the remaining forty eight higher-frequency transform values in the block 160, the circuit 128 does not waste processing power or time incorporating the higher-frequency transform values into the decoding and down-converting algorithms. Because these discarded higher-frequency transform values would make little or no contribution to the decoded lo-res version of the image, discarding these transform values has little or no effect on the quality of the lo-res version.

FIG. 15A is a block 164 of transform values that represent an encoded, interlaced image, and a sub-block 166 of the transform values that the circuit 124 uses to generate the values of the interlaced sub-sampled pixels S of FIGS. 12 and 14. The inventors found that the transform values in the sub-block 166 give good decoding and down-converting results. Because the sub-block 166 is not in matrix form, the inverse zigzag scan pattern of the circuit 124 can be modified such that the circuit 124 scans the transform values from the sub-block 166 into a matrix form such as a 4×4 matrix.

Figure 1:
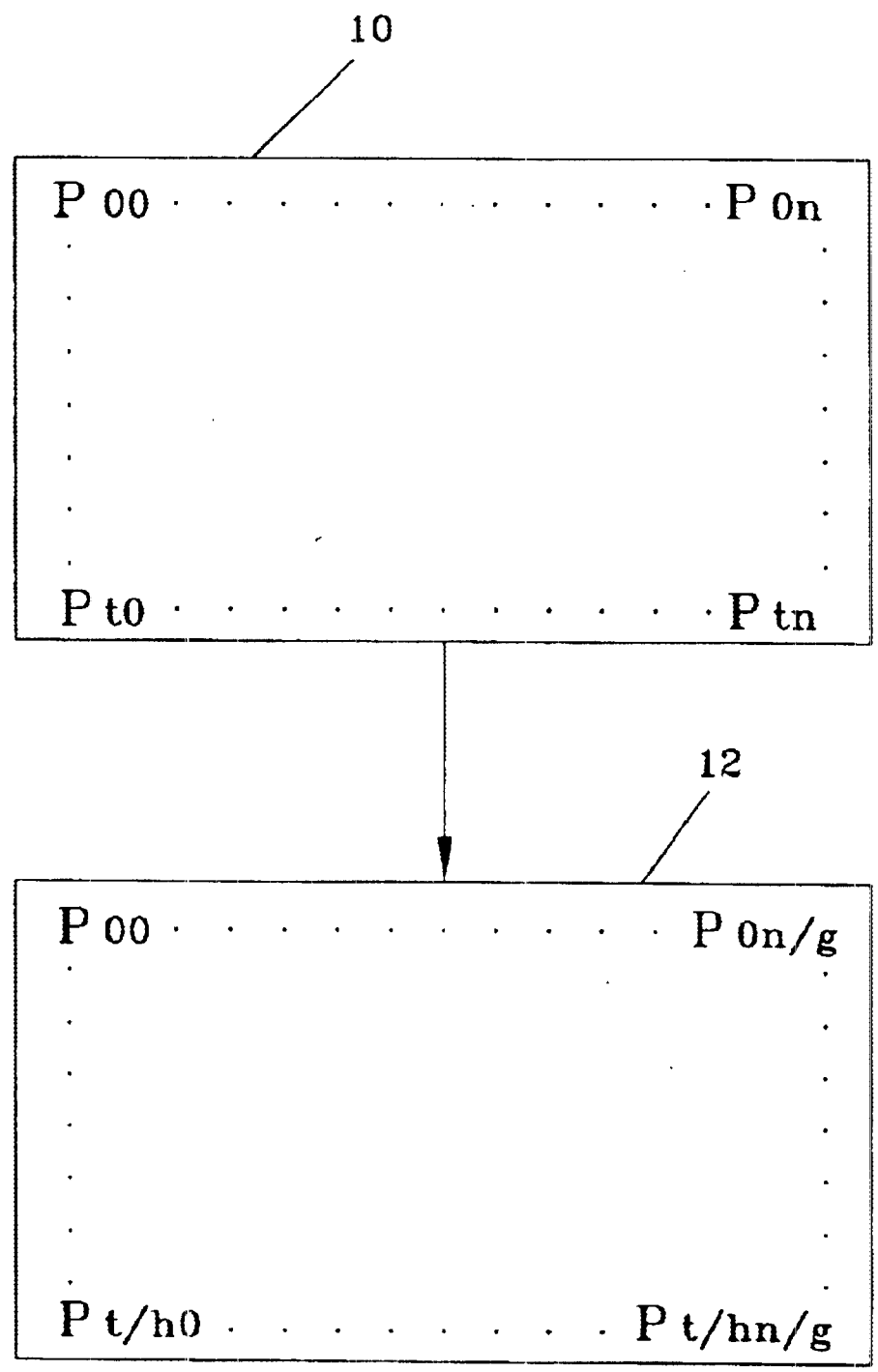
FIG. 1 are pixel diagrams of a hi-res version and a lo-res version of an image.
Figure 2:
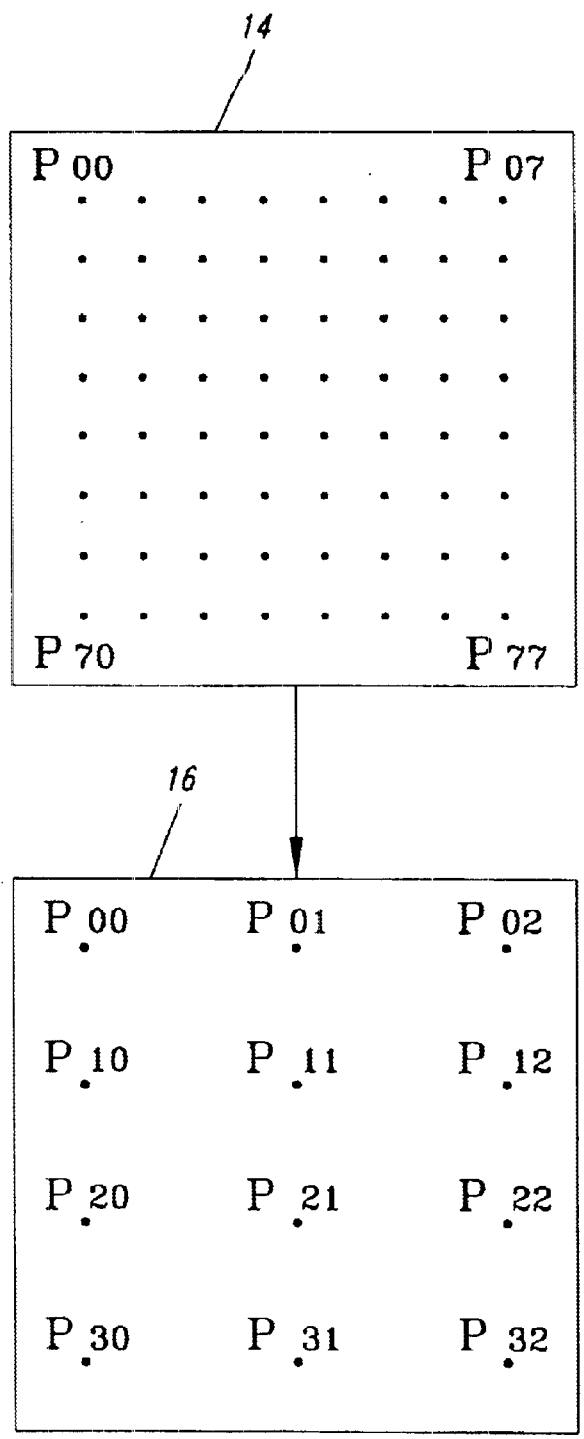
FIG. 2 are pixel diagrams of macro blocks from the hi-res and lo-res image versions, respectively, of FIG. 1.
Figure 3:
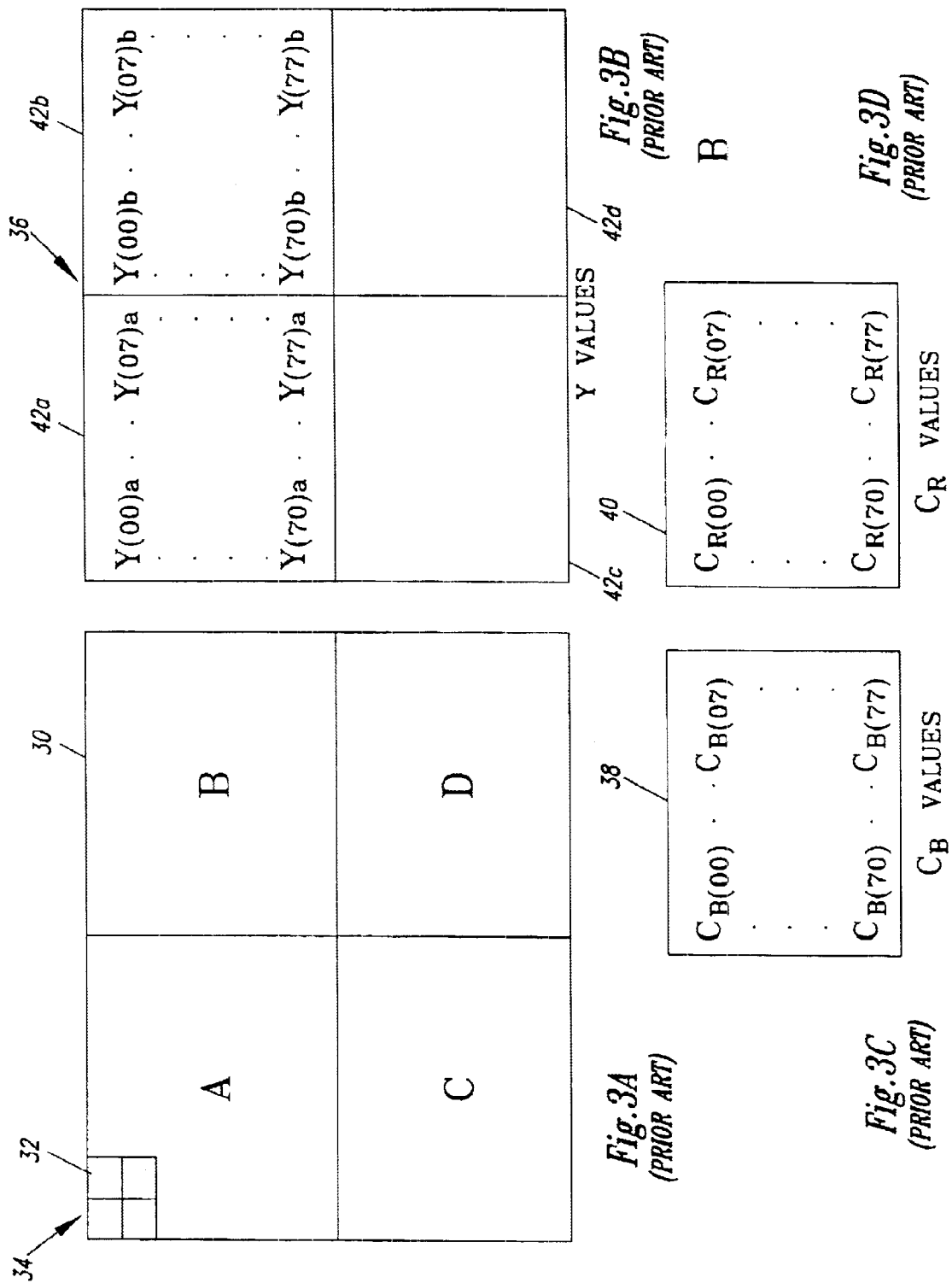
FIG. 3A is a diagram of a conventional macro block of pixels in an image.
FIG. 3B is a diagram of a conventional block of pre-compression luminance values that respectively correspond to the pixels in the macro block of FIG. 3A.
FIGS. 3C and 3D are diagrams of conventional blocks of pre-compression chroma values that respectively correspond to the pixel groups in the macro block of FIG. 3A.
Figure 4:
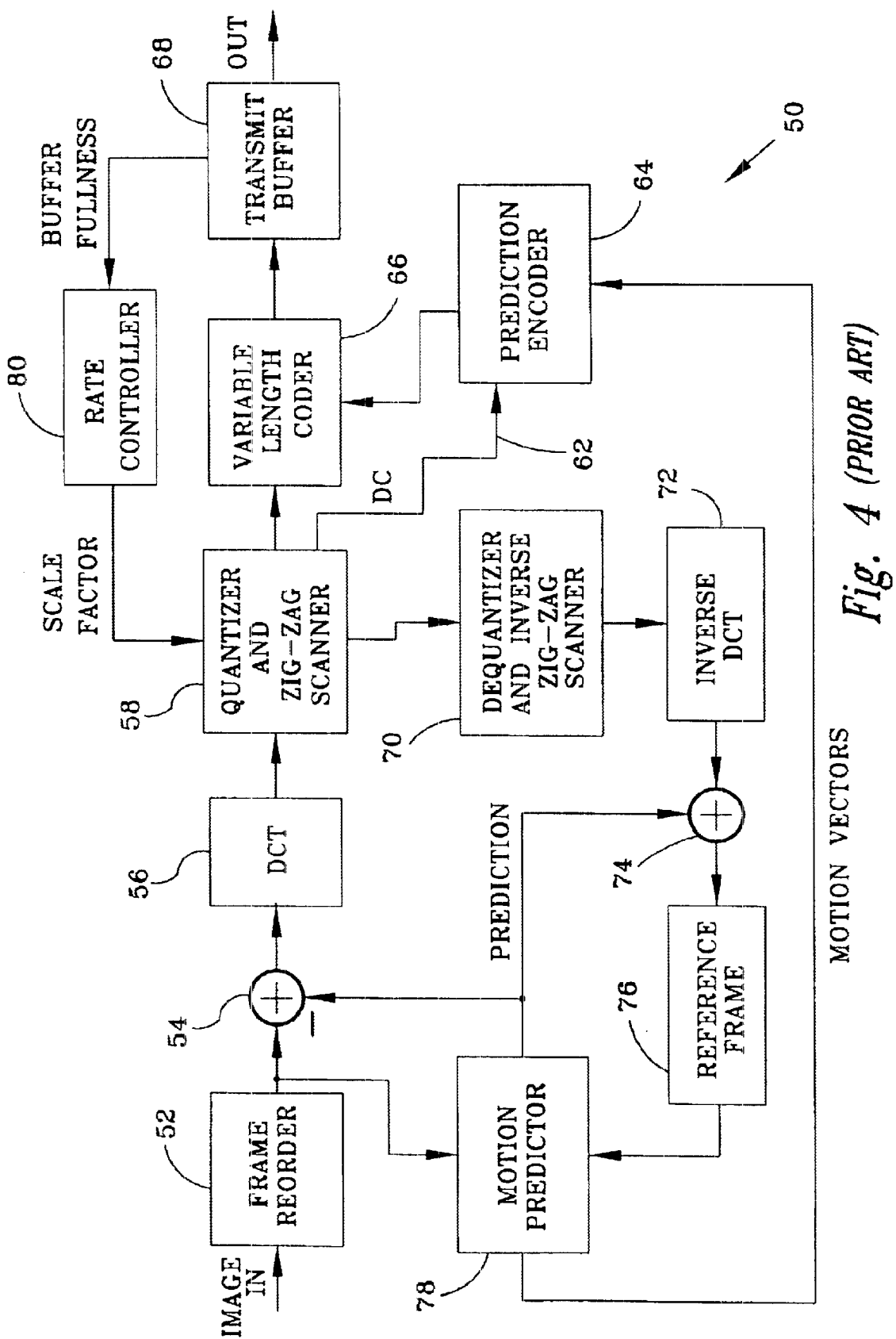
FIG. 4 is a block diagram of a conventional MPEG encoder.
Figure 5:
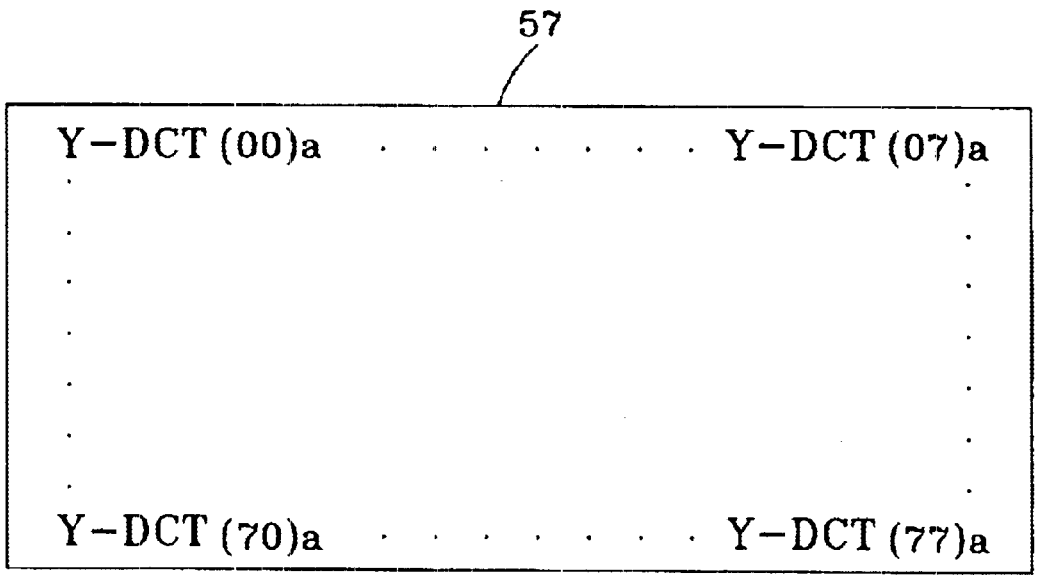
FIG. 5 is a block of luminance transform values that are generated by the encoder of FIG. 4 and that respectively correspond to the pre-compression luminance pixel values of FIG. 3B.
Figure 9:
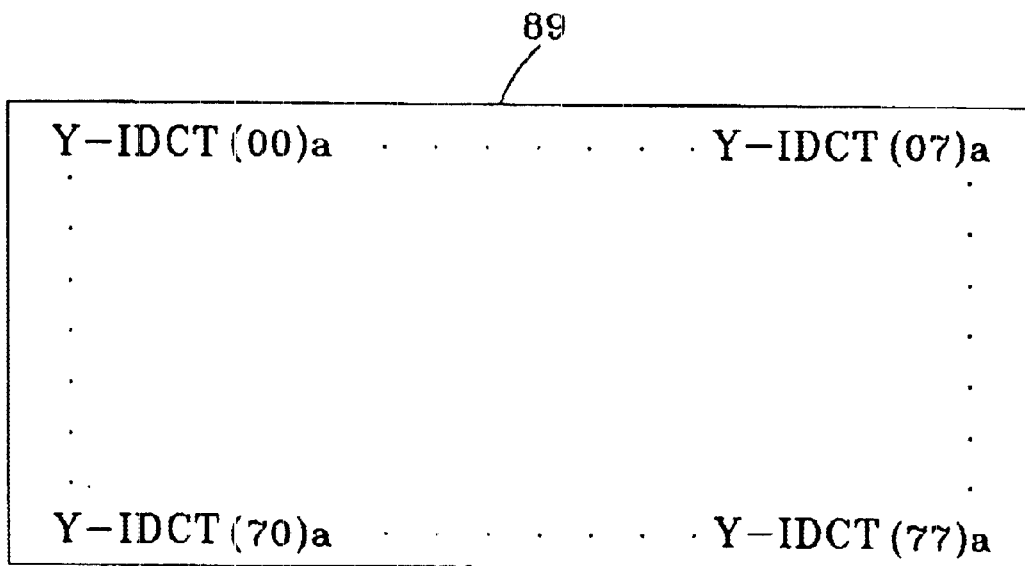
FIG. 9 is a block of inverse transform values that are generated by the decoder of FIG. 8 and that respectively correspond to the luminance transform values of FIG. 5 and the pre-compression luminance pixel values of FIG. 3B.
Figure 6:
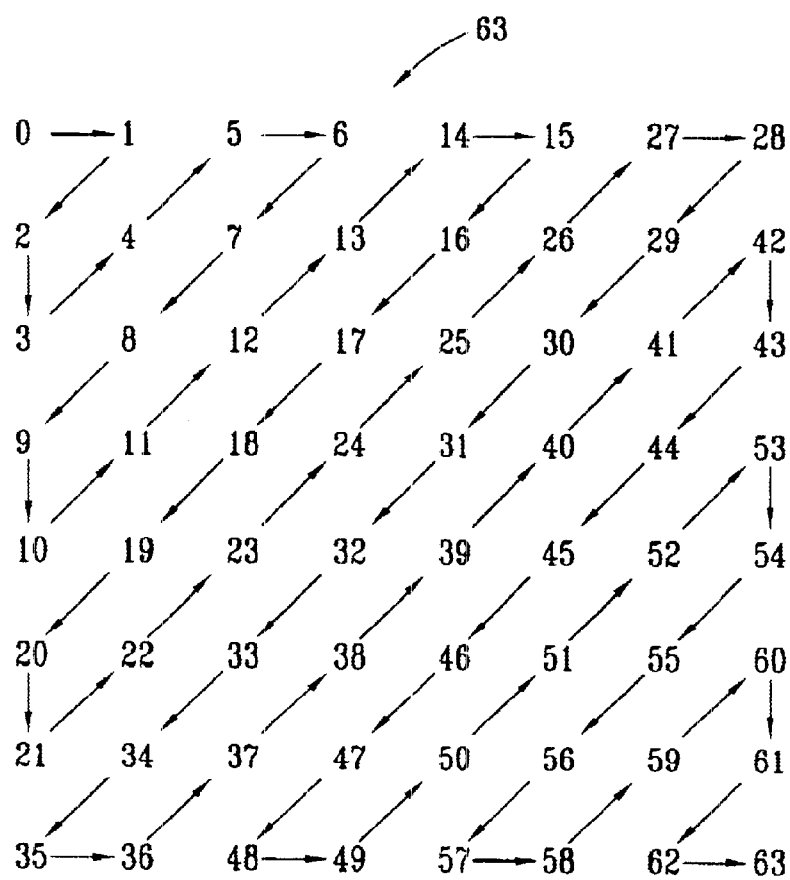
FIG. 6 is a conventional zigzag sampling pattern that can be implemented by the quantizer and zigzag scanner of FIG. 4.

Referring to FIGS. 10–15B, the mathematical details of the decoding and sub-sampling algorithms executed by the decoder 110 are discussed. For example purposes, these algorithms are discussed operating on a sub-block of the non-interlaced block 57 of luminance values Y (FIG. 5), where the sub-block is the same as the sub-block 162 of FIG. 15A.

For an 8×8 block of transform values f(u,v), the inverse DCT (IDCT) transform is:

$$F(x, y) = \frac{1}{4}\sum_{u=0}^{7}\sum_{v=0}^{7} C_u C_v f(u, v)\cos\left[\frac{2(x+1)u\pi}{16}\right]\cos\left(\frac{(2y+1)v\pi}{16}\right) \quad 1)$$

where F(x,y) is the IDCT value, i.e., the pixel value, at the location x, y of the 8×8 IDCT matrix. The constants $C_u$ and $C_v$ are known, and their specific values are not important for this discussion. Equation 1 can be written in matrix form as:

$$P(x, y) = \begin{bmatrix} Y_{DCT00} & \cdots & Y_{DCT07} \\ \vdots & & \vdots \\ Y_{DCT70} & \cdots & Y_{DCT77} \end{bmatrix} \cdot \begin{bmatrix} D_{(x,y)00} & \cdots & D_{(x,y)07} \\ \vdots & & \vdots \\ D_{(x,y)70} & \cdots & D_{(x,y)77} \end{bmatrix} \quad 2)$$

where P(x, y) is the pixel value being calculated, the matrix $Y_{DCT}$ is the matrix of transform values $Y_{DCT(u,v)}$ for the corresponding block of decoded pixel values to which P(x,y) belongs, and the matrix D(x,y) is the matrix of constant coefficients that represent the values on the right side of equation (1) other than the transform values f(u,v). Therefore, as equation (2) is solved for each pixel value P(x, y), $Y_{DCT}$ remains the same, and D(x, y), which is a function of x and y, is different for each pixel value P being calculated.

The one-dimensional IDCT algorithm is represented as follows:

$$F(x) = \frac{1}{2}\sum_{u=0}^{7} C_u f(u)\cos\left[\frac{(2x+1)u\pi}{16}\right] \quad 3)$$

where F(x) is a single row of inverse transform values, and f(u) is a single row of transform values. In matrix form, equation (3) can be written as:

$$[P_0 \ldots P_7] = [Y_{DCT0} \ldots Y_{DCT7}] \cdot \begin{bmatrix} D_{00} & \cdots & D_{07} \\ \vdots & & \vdots \\ D_{70} & \cdots & D_{77} \end{bmatrix} \quad 4)$$

where each of the decode pixel values P equals the inner product of the row of transform values $Y_{DCT0}$–$Y_{DCT7}$ with each respective row of the matrix D. That is, for example $P_0 = [Y_{DCT0}, \ldots, Y_{DCT7}] \cdot [D_{00}, \ldots, D_{07}]$, and so on. Thus, more generally in the one-dimensional case, a pixel value $P_x$ can be derived according to the following equation:

$$P_i = Y_{DCT} \cdot D_i \quad 5)$$

where $D_i$ is the ith row of the matrix D of equation (4). Now, as stated above in conjunction with FIG. 11, the values of a number of pixels in the first and second rows of the sub-block 144 are combined to generate the sub-sampled pixel $S_{00}$. However, for the moment, let's assume that only row 0 of the pixels P exists, and that only one row of sub-sampled pixels $S_0$, $S_1$, and $S_2$ is to be calculated. Applying the one-dimensional IDCT of equations (4) and (5) to a single row such as row 0, we get the following equation:

$$S_z = \sum_{i=0}^{n} W_i \cdot P_i, iE \quad 6)$$

Where $S_z$ is the value of the sub-sampled pixel, $W_i$ is the weighting factor for a value of a pixel $P_i$, and i=0–n represents the locators of the particular pixels P within the row that contribute to the value of $S_z$. For example, still assuming that only row 0 of the pixels P is present in the sub-block 144, we get the following for $S_0$:

$$S_0 = \sum_{i=0}^{3} W_i \cdot P_i \quad 7)$$

where $P_i$ equals the values of $P_0$, $P_1$, $P_2$, and $P_3$ for i=0∝3. Now, using equation (5) to substitute for P, we get the following:

$$S_z = \sum_{i=0}^{n} W_i \cdot D_i \cdot Y_{DCT} = \left(\sum_{i=0}^{n} w_i \cdot D_i\right) \cdot Y_{DCT} = R_z \cdot Y_{DCT} \quad 8)$$

where $r_z$=the sum of $w_i \cdot D_i$ for i=0–n. Therefore, we have derived a one-dimensional equation that relates the sub-sampled pixel value $S_z$ directly to the corresponding one-dimensional matrix $Y_{DCT}$ of transform values and the respective rows of the coefficients $D_i$. That is, this equation allows one to calculate the value of $S_Z$ without having to first calculate the values of $P_i$.

Now, referring to the two-dimensional equations (1) and (2), equation (5) can be extended to two dimensions as follows:

$$P_{x,y}=D_{x,y}*Y_{DCT}=D_{x,y(0,0)}Y_{DCT(0,0)} \ldots +D_{x,y(7,7)}Y_{DCT(7,7)} \quad 9)$$

where the asterisk indicates an inner product between the matrices. The inner product means that every element of the matrix $D_{X,Y}$ is multiplied by the respective element of the matrix $Y_{DCT}$, and the sum of these products equals the value of $P_{X,Y}$. Equation (8) can also be converted into two dimensions as follows:

$$S_{yz} = \left(\sum_{i=0}^{n} w_i \cdot D_i\right) * Y_{DCT} = R_{yz} * Y_{DCT} \quad 10)$$

Therefore, the matrix $R_{YZ}$ is a sum of the weighted matrices $D_i$ for i=0–n. For example, referring again to FIG. 11, the value of the sub-sampled pixel $S_{00}$ is given by:

$$S_{00} = \left(\sum_{i=0}^{7} w_i \cdot D_i\right) * Y_{DCT} = R_{00} * Y_{DCT} \quad 11)$$

where i=0 to 7 corresponds to the values of $P_{00}, P_{01}, P_{02}, P_{03}, P_{10}, P_{11}, P_{12}$, and $P_{13}$, respectively. Thus, the circuit 124 of FIG. 10 calculates the value of the sub-sampled pixel $S_{00}$ directly from the transform values and the associated transform coefficient matrices. Therefore, the circuit 124 need not perform an intermediate conversion into the pixel values P.

Equation (11) is further simplified because as stated above in conjunction with FIG. 15A, only sixteen transform values in the sub-block 162 are used in equation (11). Therefore, since we are doing an inner product, the matrix $R_{YZ}$ need only have sixteen elements that correspond to the sixteen transform values in the sub-block 162. This reduces the number of calculations and the processing time by approximately one fourth.

Because in the above example there are sixteen elements in both the matrices $R_{yz}$ and $Y_{DCT}$, a processor can arrange each of these matrices as a single-dimension matrix with sixteen elements to do the inner product calculation. Alternatively, if the processing circuit works more efficiently with one-dimensional vectors each having four elements, both matrices $R_{yz}$ and $Y_{DCT}$ can be arranged into four respective one-dimensional, four element vectors, and thus the value of a sub-sampled pixel $S_{yz}$ can be calculated using four inner-product calculations. As stated above in conjunction with FIG. 15B, for an interlaced image or for any transform-value sub-block that does not initially yield an efficient matrix, the inverse zigzag scanning algorithm of the block 124 of FIG. 10 can be altered to place the selected transform values in an efficient matrix format.

Figure 16:
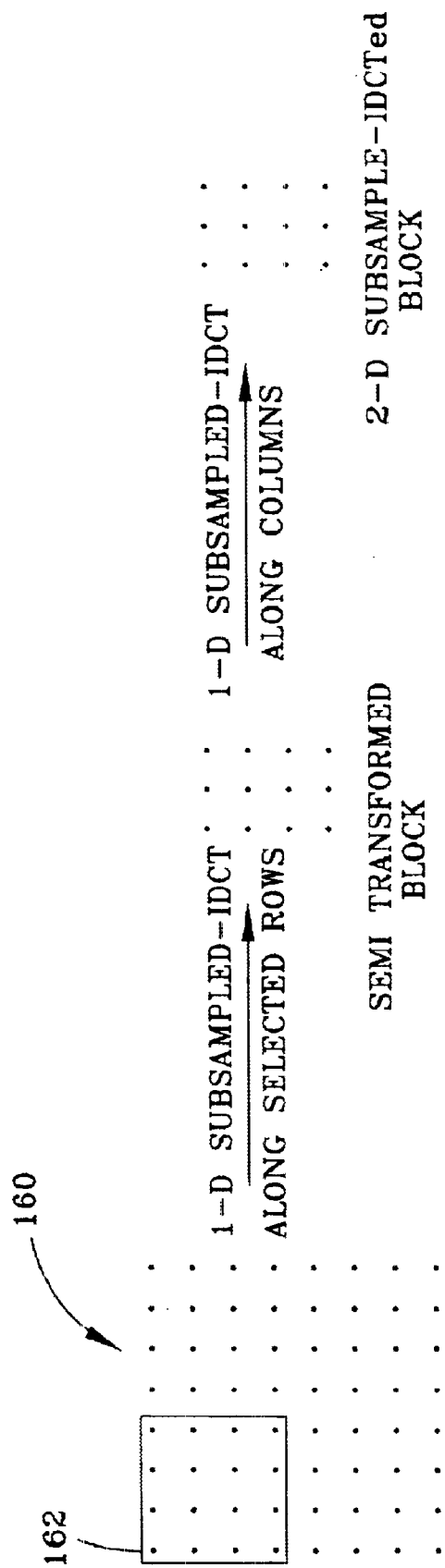
FIG. 16 shows substituting a series of one-dimensional IDCT calculations for a two-dimensional IDCT calculation with respect to the subgroup of transform values in FIG. 15A.

Referring to FIG. 16, in another embodiment of the invention, the values of the sub-sampled pixels $S_{yz}$ are calculated using a series of one-dimensional IDCT calculations instead of a single two-dimensional calculation. Specifically, FIG. 16 illustrates performing such a series of one-dimensional IDCT calculations for the sub-block 162 of transform values. This technique, however, can be used with other sub-blocks of transform values such as the sub-block 166 of FIG. 15B. Because the general principles of this one-dimensional technique are well known, this technique is not discussed further.

Next, calculation of the weighting values $W_i$ is discussed for the sub-sampling examples discussed above in conjunction with FIGS. 11 and 13A according to an embodiment of the invention. As discussed above in conjunction with FIG. 13A, because the sub-sampled pixels $S_{00}$–$S_{02}$ are halfway between the first and second rows of the pixels P, the weighting values W for values of the pixels in the first row are the same as the respective weighting values W for the values of the pixels in the second row. Therefore, for the eight pixel values in the sub-block 144, we only need to calculate four weighting values W. Used to perform the weighting in one embodiment is a four-tap (one tap for each of the four pixel values) Lagrangian interpolator with fractional delays of 1, 1⅔, and 1½, respectively for the for the sub-sampled pixel values $S_{00}$–$S_{02}$. In one embodiment, the weighting values w are assigned according, to the following equations:

$$W_0 = -\tfrac{1}{6}(d-1)(d-2)(d-3) \quad 12)$$
$$W_1 = \tfrac{1}{2}(d)(d-2)(d-3) \quad 13)$$
$$W_2 = -\tfrac{1}{2}(d)(d-1)(d-3) \quad 14)$$
$$W_3 = \tfrac{1}{6}(d)(d-1)(d-2) \quad 15)$$

Referring to FIG. 13A, the first two delays 1 and 1-⅔, correspond to the sub-sampled pixel values $S_{00}$ and $S_{01}$. Specifically, the delays indicate the positions of the sub-sampled pixels $S_{00}$ and $S_{01}$ with respect to the first, i.e., leftmost, pixel P in the respective sub-groups 144 and 146 (FIG. 11) of pixels P. For example, because $S_{00}$ is aligned with $P_{01}$ and $P_{11}$, it is one pixel-separation $D_{ph}$ from the first pixels $P_{00}$ and $P_{01}$ in a horizontal direction. Therefore, when the delay value of 1 is plugged into the equations 12–15, the only weighting w with a non-zero value is $w_1$, which corresponds to the pixel values $P_{01}$ and $P_{11}$. This makes sense because the pixel $S_{00}$ is aligned directly with $P_{01}$, and $P_{11}$, and, therefore, the weighting values for the other pixels P can be set to zero. Likewise, referring to FIGS. 11 and 13A, the sub-sampled pixel $S_1$ is 1-⅔ pixel-separations $D_{ph}$ from the first pixels $P_{02}$ and $P_{12}$ in the sub-block 146. Therefore, because the pixel $S_{01}$ is not aligned with any of the pixels P, then none of the weighting values w equals zero. Thus, for the sub-sampled pixel $S_{01}$, $W_0$ is the weighting value for the values of $P_{02}$ and $P_{12}$, $W_1$ is the weighting value for the values of $P_{03}$ and $P_{13}$, $W_2$ is the weighting values for the values of $P_{04}$ and $P_{14}$, and $W_3$ is the weighting value for the values of $P_{05}$ and $P_{15}$.

In one embodiment, the delay for the sub-sampled pixel $S_{02}$ is calculated differently than for the sub-sampled pixels $S_{00}$ and $S_{01}$. To make the design of the Lagrangian filter more optimal, it is preferred to use a delay for $S_{02}$ of 1-⅓. Conversely, if the delay is calculated in the same way as the delays for $S_{00}$ and $S_{01}$, then it would follow that because $S_{02}$ is 2-⅓ pixel-separations $D_{ph}$ from the first pixel $P_{04}$ in the sub-group 148, the delay should be 2-⅓. However, so that the optimal delay of 1-⅓ can be used, we calculate the delay as if the pixels $P_{05}$ and $P_{15}$ are the first pixels in the sub-group 148, and then add two fictional pixels $P_{08}$ and $P_{18}$, which are given the same values as $P_{07}$ and $P_{17}$, respectively. Therefore, the weighting functions $w_0$–$w_3$ correspond to the pixels $P_{05}$, $P_{15}$, $P_{06}$ and $P_{16}$, $P_{07}$ and $P_{17}$, and the fictitious pixels $P_{08}$ and $P_{18}$, respectively. Although this technique for calculating the delay for $S_{02}$ may not be as accurate as if we used a delay of 2-⅓, the increase in the Lagrangian filter's efficiency caused by using a delay of 1-⅓ makes up for this potential inaccuracy.

Furthermore, as stated above, because all of the sub-sampled pixels $S_{00}$–$S_{02}$ lie halfway between the rows 0 and 1 of pixels P, a factor of ½ can be included in each of the weighting values so as to effectively average the weighted values of the pixels P in row 0 with the weighted values of the pixels P in the row 1. Of course, if the sub-sampled pixels $S_{00}$–$S_{02}$ were not located halfway between the rows, then a second Lagrangian filter could be implemented in a vertical direction in a manner similar to that described above for the horizontal direction. Or, the horizontal and vertical Lagrangian filters could be combined into a two-dimensional Lagrangian filter.

Referring to FIGS. 12 and 14, for the interlaced block 150, the sub-sampled pixels $S_{00}$–$S_{02}$ are vertically located one-fourth of the way down between the rows 0 and 2 of pixels. Therefore, in addition to being multiplied by the respective weighting values $w_i$, the values of the pixels P in the respective sub-blocks can be bilinearly weighted. That is, the values of the pixels in row 0 are vertically weighted by ¾ and the values of the pixels in row 2 are vertically weighted by ¼ to account for the uneven vertical alignment. Alternatively, if the sub-sampled pixels S from block to block do not have a constant vertical alignment with respect to the pixels P, then a Lagrangian filter can be used in the vertical direction.

The above-described techniques for calculating the values of the sub-sampled pixels S can be used to calculate both the luminance and chroma values of the pixels S.

Figure 17:
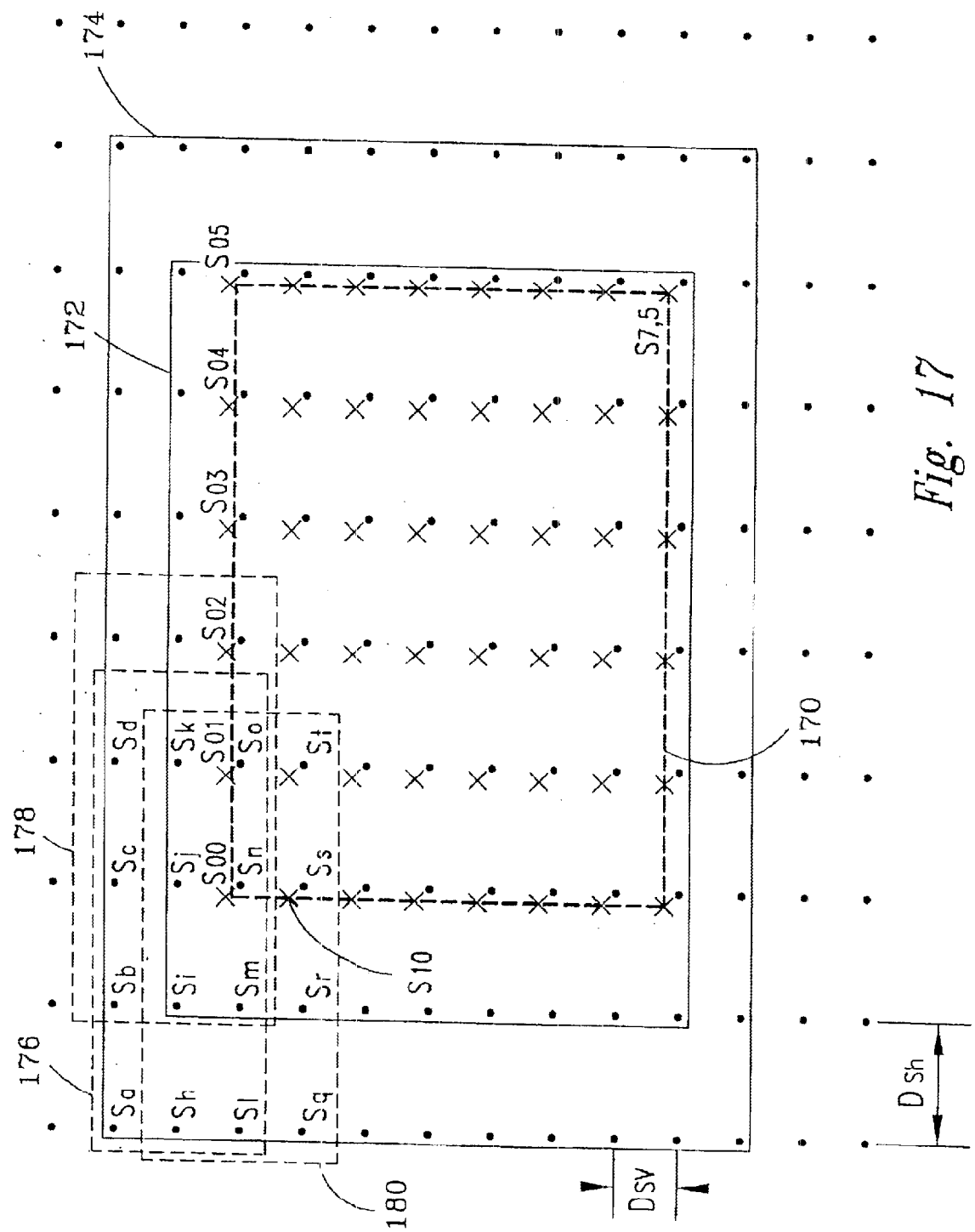
FIG. 17 shows a motion-decoding technique according to an embodiment of the invention.

Referring to FIG. 17, the motion compensation performed by the decoder 110 of FIG. 10 is discussed according to an embodiment of the invention. For example purposes, assume that the encoded version of the image is non-interlaced and includes 8×8 blocks of transform values, and that the circuit 124 of FIG. 10 decodes and down-coverts these encoded blocks into 4×3 blocks of sub-sampled pixels S such as the block 142 of FIG. 11. Furthermore, assume that the encoded motion vectors have a resolution of ½ pixel in the horizontal direction and ½ pixel in the vertical direction. Therefore, because the lo-res version of the image has ⅜ the horizontal resolution and ½ the vertical resolution of the hi-res version of the image, the scaled motion vectors from the circuit 134 (FIG. 10) have a horizontal resolution of ⅜×½=(3/16)$D_{sh}$ and a vertical resolution of ½×½=(¼)$D_{sv}$. Thus, the horizontal fractional delays are multiples of 1/16 and the vertical fractional delays are multiples of ¼. Also assume that the encoded motion vector had a value of 2.5 in the horizontal direction and a value of 1.5 in the vertical direction. Therefore, the example scaled motion vector equals 2-½× ⅜=15/16 in the horizontal direction and 1-½×½=¾ in the vertical direction. Thus, this scaled motion vector points to a matching macro block 170 whose pixels S are represented by "x".

The pixels of the block 170, however, are not aligned with the pixels S (represented by dots) of the reference macro block 172. The reference block 172 is larger than the matching block 170 such that it encloses the area within which the block 170 can fall. For example, the pixel $S_{00}$ can fall anywhere between or on the reference pixels $S_I$, $S_J$, $S_M$, and $S_N$. Therefore, in a manner similar to that described above for the pixels S of the block 142 (FIG. 11), each pixel S of the matching block 170 is calculated from the weighted values of respective pixels S in a filter block 174, which includes the blocks 170 and 172. In the illustrated embodiment, each pixel S of the block 170 is calculated from a sub-block of 4×4=16 pixels from the filter block 174. For example, the value of $S_{00}$ is calculated from the weighted values of the sixteen pixels S in a sub-block 176 of the filter block 174.

In one embodiment, a four-tap polyphase Finite Impulse Response FIR filter (e.g., a Lagrangian filter) having a delay every (1/16) $D_{sh}$ is used in the horizontal direction, and a four-tap FIR filter having a delay every (¼) $D_{sv}$ is used in the vertical direction. Therefore, one could think of the combination of these two filters as a set of 16×4=64 two-dimensional filters for each respective phase in both the horizontal and vertical directions. In this example, the pixel $S_{00}$ is horizontally located (1-15/16)$D_{sh}$ from the first column of pixels (i.e., $S_a$, $S_h$, $S_I$, and $S_q$) in the sub-block 176 and the horizontal contributions to the respective weighting values w are calculated in a manner similar to that discussed above in conjunction with FIG. 13A. Likewise, the pixel $S_{00}$ is vertically located (1-¾)$D_{sv}$ from the first row of pixels (i.e., $S_a$–$S_d$) in the sub-block 176 and vertical contributions of the weighting functions are calculated in a manner similar to that used to calculate the horizontal contributions. The horizontal and vertical contributions are then combined to obtain the weighting function for each pixel in the sub-block 176 with respect to $S_{00}$, and the value of $S_{00}$ is calculated using these weighting functions. The values of the other pixels S in the matching block 170 are calculated in a similar manner. For example, the value of the pixel $S_{01}$ is calculated using the weighted values of the pixels in the sub-block 178, and the value of the pixel $S_{10}$ is calculated using the values of the pixels in the sub-block 180.

Therefore, all of the motion compensation pixels $S_{00}$–$S_{75}$ are calculated using 4 multiply-accumulates (MACS)×6 pixels per row×11 rows (in the filter block 174)=264 total MACS for horizontal filtering, and 4 MACS×8 pixels per column×9 columns=288 MACS for vertical filtering for a total of 552 MACS to calculate the pixel values of the matching block 170. Using a vector image processing circuit that operates on 1×4 vector elements, we can break down the horizontal filtering into 264÷4=66 1×4 inner products, and can break down the vertical filtering into 288÷4=72 1×4 inner products.

Referring to FIGS. 10 and 15, once the motion compensation circuit 136 calculates the values of the pixels in the matching block 170, the summer 130 adds these pixel values to the respective residuals from the inverse DCT and sub-sample circuit 128 to generate the decoded lo-res version of the image. Then, the decoded macro block is provided to the frame buffer 132 for display on the HDTV receiver/display 138. If the decoded macro block is part of a reference frame, it may also be provided to the motion compensator 136 for use in decoding another motion-predicted macro block.

The motion decoding for the pixel chroma values can be performed in the same manner as described above. Alternatively, because the human eye is less sensitive to color variations than to luminance variations, one can use bilinear filtering instead of the more complicated Lagrangian technique described above and still get good results.

Figure 7:
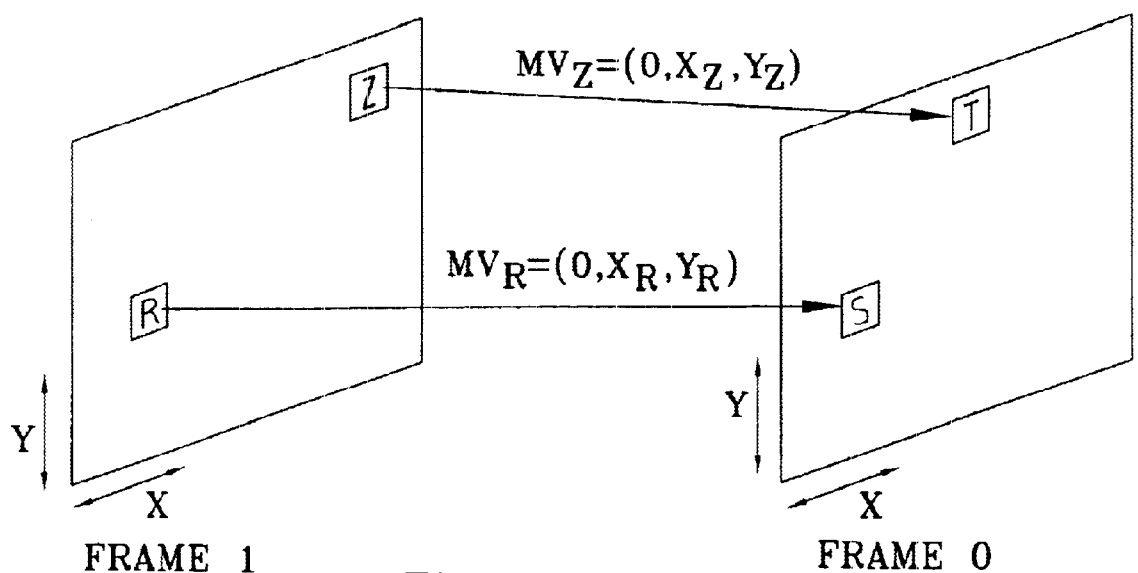
FIG. 7 illustrates the concept of conventional motion vectors.
Figure 8:
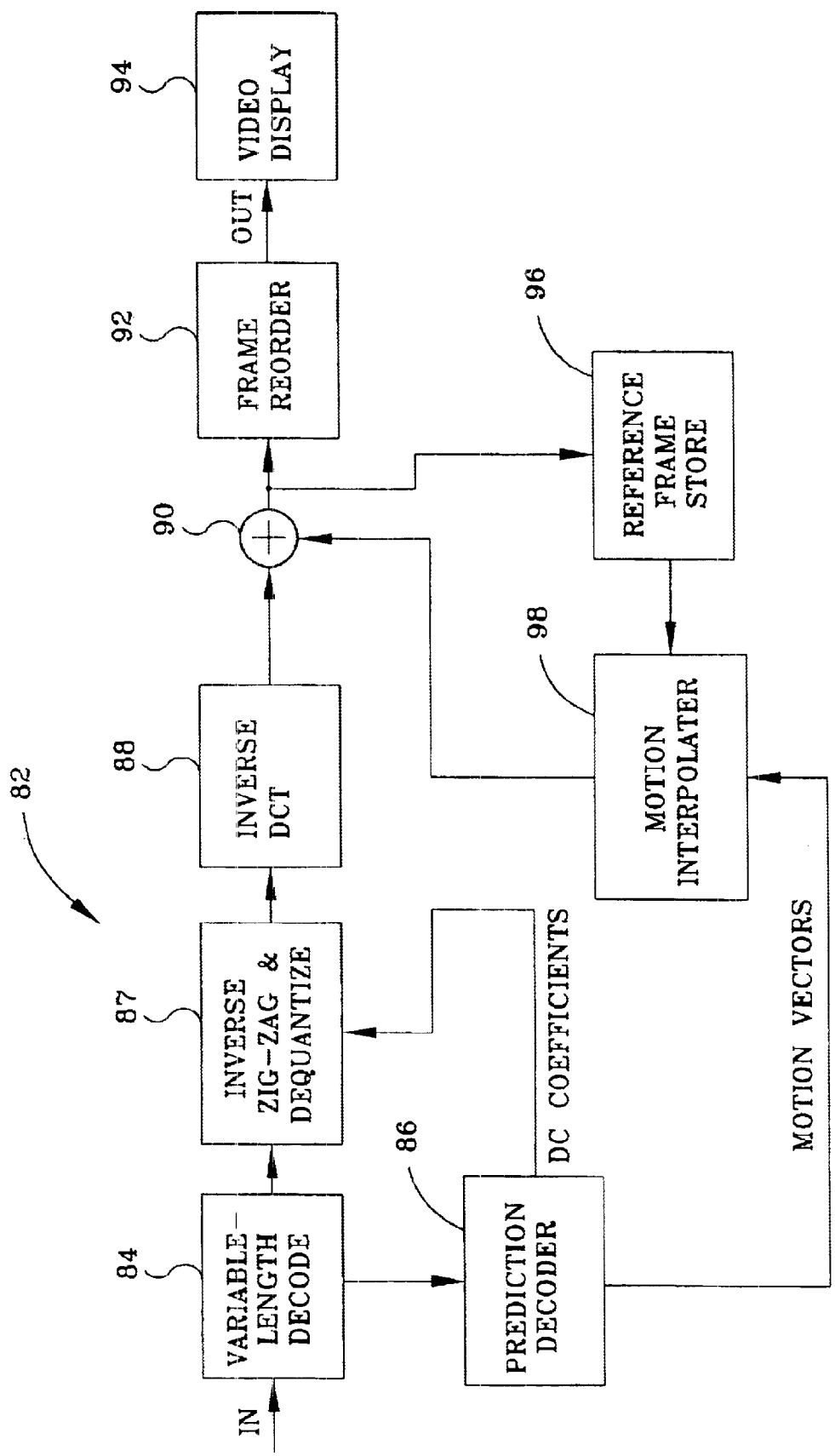
FIG. 8 is a block diagram of a conventional MPEG decoder.

Furthermore, as discussed above in conjunction with FIG. 7, some motion-predicted macro blocks have motion vectors that respectively point to matching blocks in different frames. In such a case, the values of the pixels in each of the matching blocks is calculated as described above in conjunction with FIG. 16, and are then averaged together before the residuals are added to produce the decoded macro block. Alternatively, one can reduce processing time and bandwidth by using only one of the matching blocks to decode the macro block. This has been found to produce pictures of acceptable quality with a significant reduction in decoding time.

From the foregoing it will be appreciated that, although specific embodiments of the invention have been described herein for purposes of illustration, various modifications may be made without deviating from the spirit and scope of the invention. For example, although down-conversion of an image for display on a lower-resolution display screen is discussed, the above-described techniques have other applications. For example, these techniques can be used to down-convert an image for display within another image. This is often called Picture-In-Picture (PIP) display. Additionally, although the decoder 110 of FIG. 10 is described as including a number of circuits, the functions of these circuits may be performed by one or more conventional or special-purpose processors or may be implemented in hardware.

What is claimed:

1. An image processing circuit, comprising:
   a processor operable to,
      receive an encoded portion of a first version of an image, the first version having a first group of pixels that correspond to the encoded portion and that provide a first resolution, the encoded portion including transform values that correspond to the first group of pixels;
      represent the pixels in the first group as a function of the transform values; and
      convert the encoded portion directly into a decoded portion of a second version of the image, the decoded portion having a second group of pixels that are generated by weighting the function of the transform values according to their respective locations of the pixels in the first group relative to the locations of the pixels in the second group, the second group of pixels providing a second resolution that is different than the first resolution.

2. The processing circuit of claim 1 wherein the resolution of the second version of the image is lower than the resolution of the first version of the image.

3. The processing circuit of claim 1 wherein the encoded portion of the first version of the image is represented by transform values.

4. An image processing circuit, comprising:
   a processor operable to,
      receive a first group of transform values that represents a portion of a first version of an image,
      select a second group of transform values from the first group, the second group having fewer transform values than the first group, and
      convert the second group of transform values directly into a first group of pixel values that represents a portion of a second version of the image, the second version of the image having fewer pixels than the first version of the image;
   wherein the first group of transform values represents a second group of pixel values that represents the portion of the first version of the image; and
   wherein the processor is operable to convert the second group of transform values directly into a pixel value of the first group of pixel values by mathematically combining transform coefficients associated with pixel values of the second group of pixel values.

5. An image processing circuit, comprising:
   a processor operable to,
      receive a first group of transform values that represents a portion of a first version of an image,
      select a second group of transform values from the first group, the second group having fewer transform values than the first group, and
      convert the second group of transform values directly into a first group of pixel values that represents a portion of a second version of the image, the second version of the image having fewer pixels than the first version of the image;
   wherein the first group of transform values represents a second group of pixel values that represents the portion of the first version of the image; and
   wherein the processor is operable to convert the second group of transform values directly into a pixel value of the first group of pixel values by,
      weighting transform coefficients associated with pixel values of the second group of pixel values, and
      mathematically combining the weighted transform coefficients.

6. An image processing circuit, comprising:
   a processor operable to,
      receive a first group of transform values that represents a portion of a first version of an image,
      select a second group of transform values from the first group, the second group having fewer transform values than the first group, and
      convert the second group of transform values directly into a first group of pixel values that represents a portion of a second version of the image, the second version of the image having fewer pixels than the first version of the image;
   wherein the first group of transform values represents a second group of pixel values that represents the portion of the first version of the image; and
   wherein the processor is operable to convert the second group of transform values directly into a pixel value of the first group of pixel values by,
      weighting transform coefficients associated with pixel values of the second group of pixel values, and
      summing corresponding ones of the weighted transform coefficients.

7. An image processing circuit, comprising:
   a processor operable to,
      receive a first group of transform values that represents a portion of a first version of an image,
      select a second group of transform values from the first group, the second group having fewer transform values than the first group, and
      convert the second group of transform values directly into a first group of pixel values that represents a portion of a second version of the image, the second version of the image having fewer pixels than the first version of the image;
   wherein each of the transform values in the first group of transform values respectively comprises a Discrete-Cosine-Transform value;
   wherein the first group of transform values represents a second group of pixel values that represents the portion of the first version of the image; and
   wherein the processor is operable to convert the second group of transform values directly into a pixel value of the first group of pixel values by,
      weighting Inverse-Discrete-Cosine-Transform coefficients associated with pixel values of the second group of pixel values,
      summing corresponding ones of the weighted coefficients, and
      mathematically combining the second group of transform values and the weighted coefficients according to an Inverse-Discrete-Cosine-Transform algorithm.

8. A method, comprising:
receiving an encoded portion of a first version of an image, the first version having a first group of pixels that correspond to the encoded portion and having a first resolution, the encoded portion including transform values that correspond to the first group of pixels;
representing the pixels in the first group as a function of the transform values; and
converting the encoded portion directly into a decoded portion of a second version of the image, the decoded portion having a second group of pixels that are generated by weighting the function of the transform values according to the respective locations of the pixels in the first group relative to the locations of the pixels in the second group, the decoded portion of the second version of the image having a resolution that is different than the resolution of the first version.

9. The method of claim 8 wherein the resolution of the first version of the image is higher than the resolution of the second version of the image.

10. The method of claim 8 wherein:
the receiving comprises receiving transform values that represent the encoded portion of the first version of the image; and
the converting comprises converting the transform values into the pixels of the second group.

11. A method, comprising:
receiving a first group of transform values that represents pixels from a portion of a first version of an image;
selecting a second group of transform values from the first group, the second group being smaller than the first group;
weighting transform coefficients based on the locations of the pixels within the portion of the first version of the image; and
mathematically operating on the second group of transform values with the weighted transform coefficients to convert the second group of transform values directly into a first group of pixel values that represents a portion of a second version of the image, the second version having fewer pixels than the first version.

12. The method of claim 11 wherein:
the image comprises a video frame;
the portion of the first version of the video frame is non-interlaced;
the portion of the second version of the video frame is non-interlaced;
the first group of transform values comprises an 8×8 block of transform values, the block having an upper-left quadrant; and
the second group of transform values comprises the transform values from the upper-left quadrant of the block.

13. The method of claim 11 wherein:
the image comprises a video frame;
the portion of the first version of the video frame is interlaced;
the portion of the second version of the video frame is interlaced;
the first group of transform values comprises an 8-row× 8-column block of transform values; and
the second group of transform values comprises the first three transform values from each of the first four rows of the block and the first transform value from each of the last four rows of the block.

14. A method, comprising:
receiving a first group of transform values that represents a portion of a first version of an image;
selecting a second group of transform values from the first group, the second group being smaller than the first group;
converting the second group of transform values directly into a first group of pixel values that represents a portion of a second version of the image, the second version having fewer pixels than the first version;
wherein the first group of transform values represents a second group of pixel values that represents the portion of the first version of the image; and
wherein converting the second group of transform values comprises mathematically combining transform coefficients associated with respective subgroups of pixel values from the second group of pixel values to generate each pixel value in the first group of pixel values.

15. A method, comprising:
receiving a first group of transform values that represents a portion of a first version of an image;
selecting a second group of transform values from the first group, the second group being smaller than the first group;
converting the second group of transform values directly into a first group of pixel values that represents a portion of a second version of the image, the second version having fewer pixels than the first version;
wherein the first group of transform values represents a second group of pixel values that represents the portion of the first version of the image; and
wherein converting the second group of transform values comprises,
weighting groups of transform coefficients associated with respective subgroups of pixel values from the second group of pixel values, and
mathematically combining the weighted transform coefficients within each group of transform coefficients.

16. A method, comprising:
receiving a first group of transform values that represents a portion of a first version of an image;
selecting a second group of transform values from the first group, the second group being smaller than the first group;
converting the second group of transform values directly into a first group of pixel values that represents a portion of a second version of the image, the second version having fewer pixels than the first version;
wherein the first group of transform values represents a second group of pixel values that represents the portion of the first version of the image; and
wherein converting the second group of transform values comprises,
weighting groups of transform coefficients associated with respective subgroups of pixel values from the second group of pixel values, and
summing corresponding ones of the weighted transform coefficients within each group of transform coefficients.

17. A method, comprising:
receiving a first group of transform values that represents a portion of a first version of an image;

selecting a second group of transform values from the first group, the second group being smaller than the first group;

converting the second group of transform values directly into a first group of pixel values that represents a portion of a second version of the image, the second version having fewer pixels than the first version;

wherein each of the transform values in the first group of transform values respectively comprises a Discrete-Cosine-Transform value;

wherein the first group of transform values represents a second group of pixel values that represents the portion of the first version of the image; and wherein converting the second group of transform values comprises, weighting groups of Inverse-Discrete-Cosine-Transform coefficients associated with respective subgroups of pixel values from the second group of pixel values, summing corresponding ones of the weighted coefficients within each group of coefficients to generate respective groups of summed coefficients, and mathematically combining the second group of transform values and the groups of summed coefficients according to an Inverse-Discrete-Cosine-Transform algorithm.

18. The image processing circuit of claim 1 wherein a pixel in the first group of pixels is separately weighted according to the location of each pixel in the second group within the decoded portion of the second version of the image.

19. The image processing circuit of claim 1 wherein a pixel in the first group of pixels is separately weighted according to its location relative to each one of the pixels in the second group.

20. The method of claim 11 wherein mathematically operating on the second group of transform values with the weighted transform coefficients comprises generating an inner product of a matrix that includes the weighted transform coefficients and a matrix that includes the second group of transform values.

\* \* \* \* \*

UNITED STATES PATENT AND TRADEMARK OFFICE
CERTIFICATE OF CORRECTION

PATENT NO.        : 6,690,836 B2
APPLICATION NO.   : 09/740511
DATED             : February 10, 2004
INVENTOR(S)       : Ramachandran Natarajan et al.

It is certified that error appears in the above-identified patent and that said Letters Patent is hereby corrected as shown below:

First page, column 1, "Related U.S. Application Data":   Delete "1999." and insert -- 1999, which claims priority to U.S. Provisional Application No. 60/089,832, filed on Jun. 19,1998. -- therefor.

Column 1, line 7:   After "This" insert -- application --; and

Column 1, line 9:   Delete "States." and insert -- States, and claims priority to U.S. Provisional Application No. 60/089,832, filed on Jun. 19, 1998. -- therefor.

Signed and Sealed this
Twentieth Day of September, 2011

David J. Kappos
*Director of the United States Patent and Trademark Office*